(12) United States Patent
Kim et al.

(10) Patent No.: US 12,124,066 B2
(45) Date of Patent: Oct. 22, 2024

(54) METHOD FOR MANUFACTURING VIEWING ANGLE COMPENSATION FILM, METHOD FOR MANUFACTURING POLARIZING PLATE, VIEWING ANGLE COMPENSATION FILM, POLARIZING PLATE, AND DISPLAY DEVICE INCLUDING SAME

(71) Applicant: LG CHEM, LTD., Seoul (KR)

(72) Inventors: Youngjin Kim, Daejeon (KR); Do Hyun Kim, Daejeon (KR); Seung Kyu Park, Daejeon (KR); Dae Hee Lee, Daejeon (KR); Ji Young Kim, Daejeon (KR); Dong Min Nho, Daejeon (KR); Kyun Do Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 799 days.

(21) Appl. No.: 17/263,079

(22) PCT Filed: Jul. 26, 2019

(86) PCT No.: PCT/KR2019/009341
§ 371 (c)(1),
(2) Date: Jan. 25, 2021

(87) PCT Pub. No.: WO2020/022838
PCT Pub. Date: Jan. 30, 2020

(65) Prior Publication Data
US 2021/0311239 A1    Oct. 7, 2021

(30) Foreign Application Priority Data
Jul. 27, 2018  (KR) ........................ 10-2018-0087809

(51) Int. Cl.
G02B 5/30     (2006.01)
B29D 11/00    (2006.01)
G02F 1/1335   (2006.01)

(52) U.S. Cl.
CPC ...... G02B 5/3033 (2013.01); B29D 11/00644 (2013.01); G02F 1/133528 (2013.01)

(58) Field of Classification Search
CPC ....... G02F 1/13363; G02B 5/305; G02B 5/30; G02B 5/3033; B29D 11/00644; B29D 11/00288; B29D 11/00788
See application file for complete search history.

(56) References Cited

U.S. PATENT DOCUMENTS 6,166,787 A     12/2000  Akins et al.
7,883,254 B2 *   2/2011  Kinoshita ............ G02B 6/0038
                                                    362/621

(Continued)

FOREIGN PATENT DOCUMENTS

EP       3761073 A1     1/2021
JP       2000-230016    8/2000

(Continued)

*Primary Examiner* — Mustak Choudhury
(74) *Attorney, Agent, or Firm* — Bryan Cave Leighton Paisner LLP

(57) ABSTRACT

Provided is a method of manufacturing a viewing angle compensation film, comprising the steps of preparing a base and forming a pattern layer on the base, wherein the pattern layer comprises a first surface comprising a flat surface and a second surface opposite to the first surface; the second surface comprises multiple protruding portions, each of the protruding portions includes a first inclined surface and a second inclined surface, and the angle θ formed by the first inclined surface and the second inclined surface is 20° to 60°. Also provided are a method of manufacturing a polarizing plate by using a viewing angle compensation film (Continued)

manufactured by the manufacturing method, a viewing angle compensation film, a polarizing plate, and a display device including same.

8 Claims, 14 Drawing Sheets

(56) References Cited

U.S. PATENT DOCUMENTS

| | | | |
|---|---|---|---|
| 8,619,212 B2 | 12/2013 | Asano et al. | |
| 9,389,340 B2 * | 7/2016 | Imaoku | G02B 1/118 |
| 10,823,368 B2 * | 11/2020 | Vasylyev | G02B 5/0278 |
| 2003/0004278 A1 | 1/2003 | Asano et al. | |
| 2003/0134988 A1 | 7/2003 | Asano et al. | |
| 2006/0250818 A1 * | 11/2006 | Tsuda | G02B 6/0053 |
| | | | 362/330 |
| 2008/0303777 A1 * | 12/2008 | Inoue | G02B 3/0056 |
| | | | 345/102 |
| 2009/0275718 A1 | 11/2009 | Um et al. | |
| 2014/0347728 A1 | 11/2014 | Lee | |

FOREIGN PATENT DOCUMENTS

| | | |
|---|---|---|
| JP | 2001-151814 | 6/2001 |
| JP | 2002-120326 | 4/2002 |
| JP | 2007503007 A | 2/2007 |
| JP | 2008-262133 | 10/2008 |
| JP | 2009098615 A | 5/2009 |
| JP | 2011-075947 | 4/2011 |
| JP | 2011075947 A | 4/2011 |
| JP | 201237881 A | 2/2012 |
| JP | 2013-076722 | 4/2013 |
| KR | 10-2006-0066092 | 6/2006 |
| KR | 10-2008-0002242 | 1/2008 |
| KR | 10-2008-0094989 | 10/2008 |
| KR | 10-2009-0115040 | 11/2009 |
| KR | 10-2011-0001444 | 1/2011 |
| KR | 10-2011-0023247 | 3/2011 |
| KR | 10-1210985 | 12/2012 |
| KR | 10-2013-0056618 | 5/2013 |
| KR | 10-1389480 B1 | 4/2014 |
| KR | 10-2014-0137188 | 12/2014 |
| KR | 10-2015-0057461 | 5/2015 |
| KR | 10-2016-0065412 | 6/2016 |
| KR | 101822701 B1 * | 7/2016 |
| KR | 20160083585 A * | 7/2016 |
| KR | 10-2017-0038299 | 4/2017 |

* cited by examiner

[Figure 1]
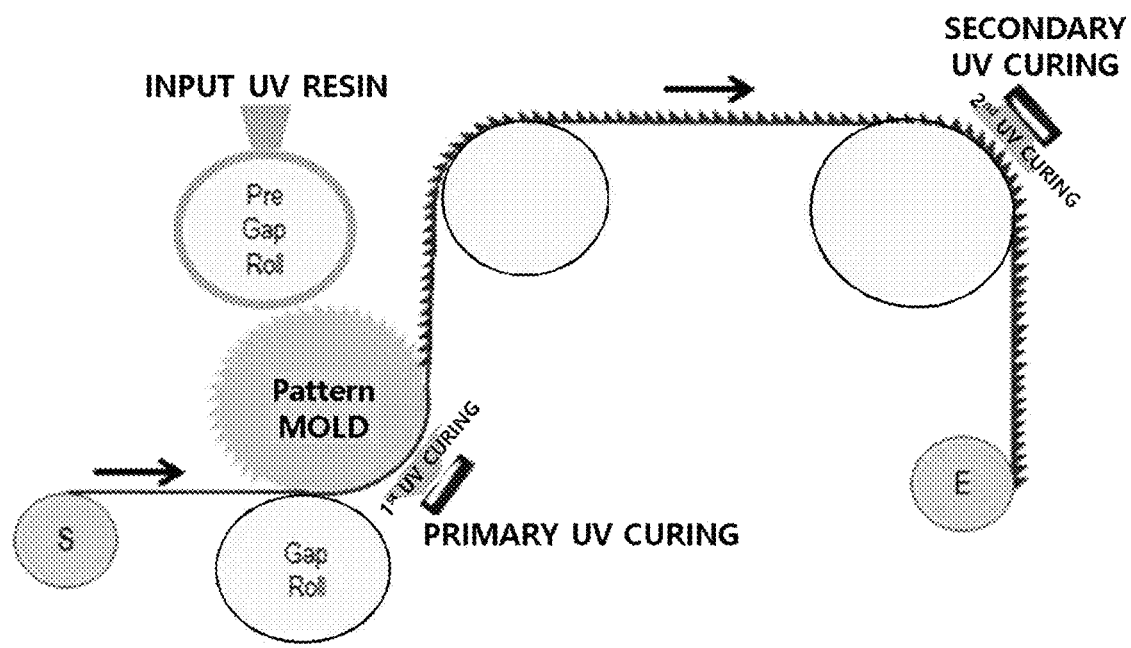
[Figure 2]
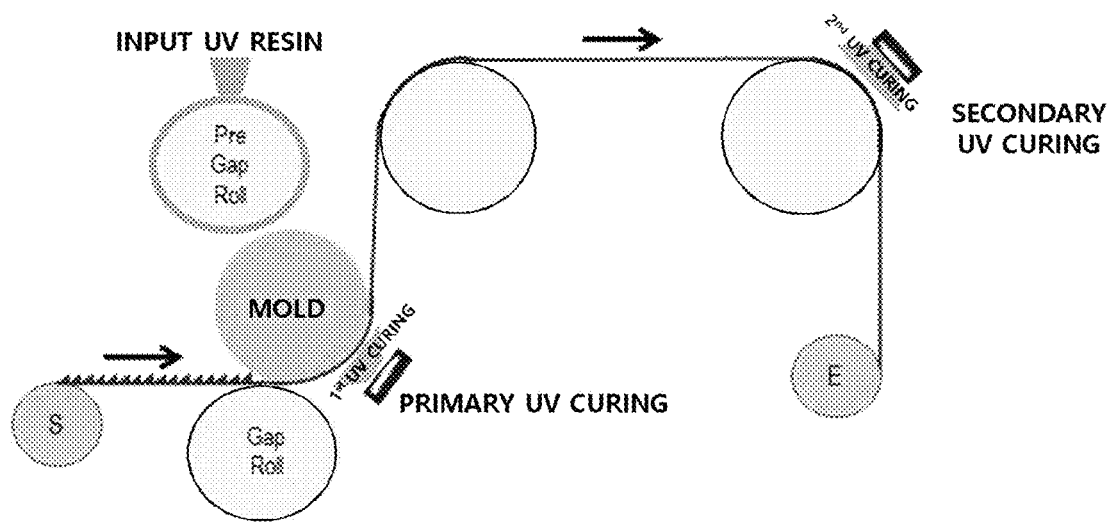

[Figure 3]
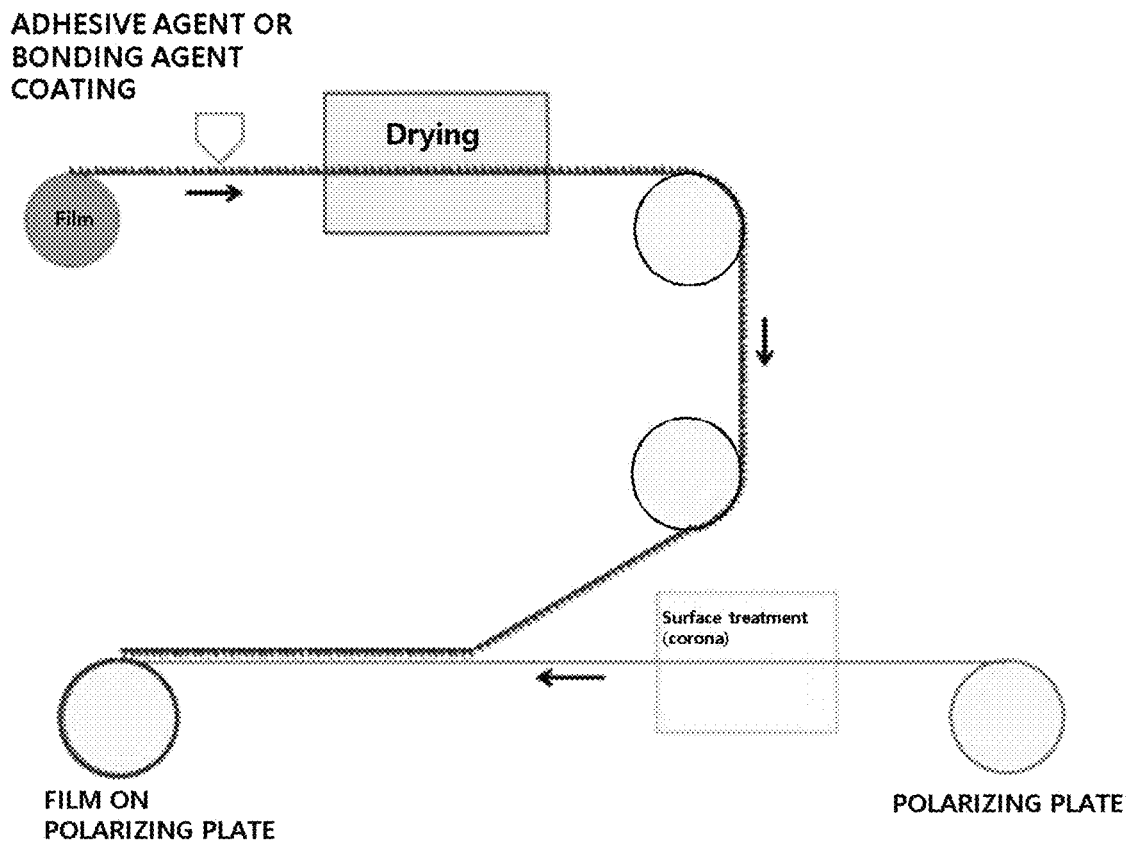
[Figure 4]
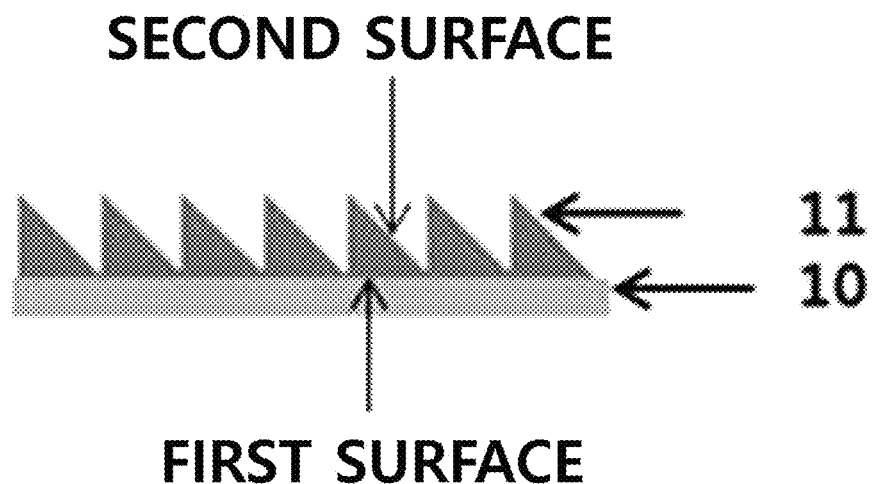

[Figure 5]
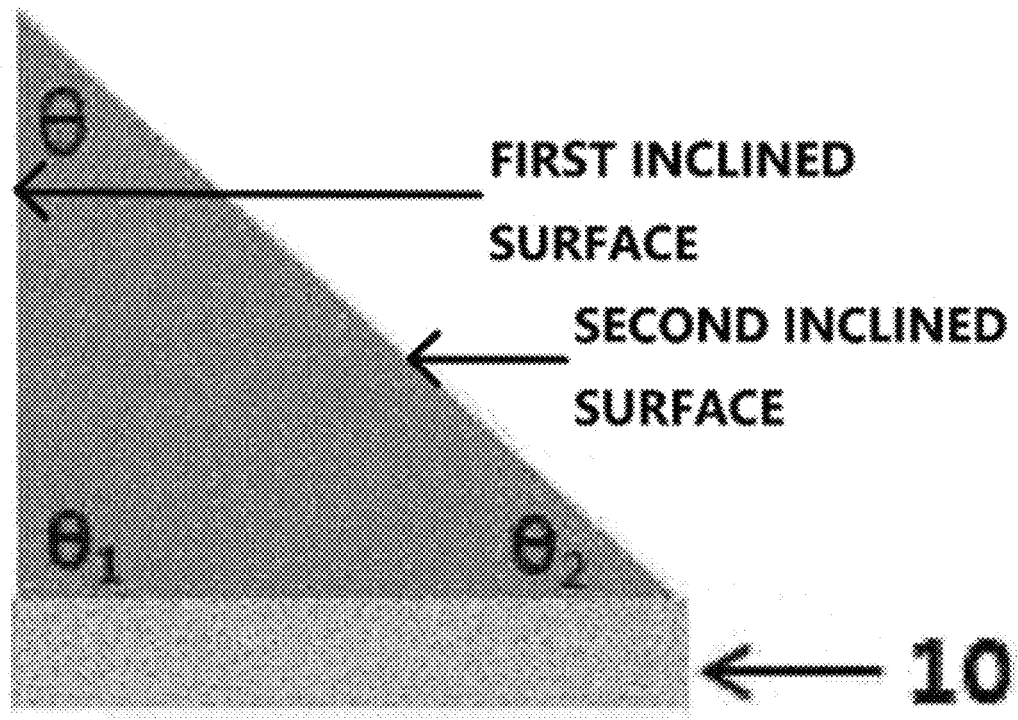
[Figure 6]
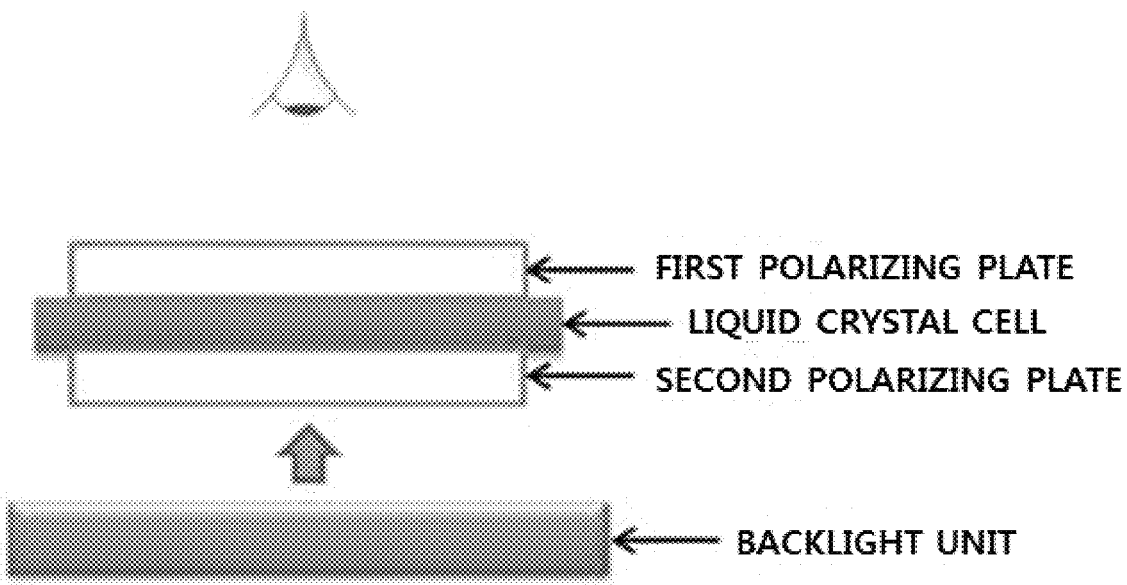

[Figure 7]
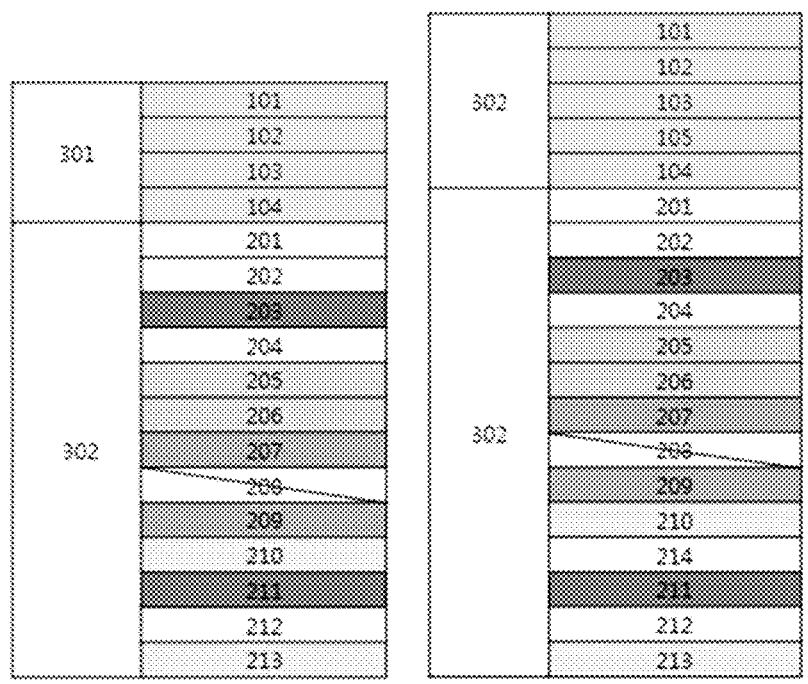
[Figure 8]
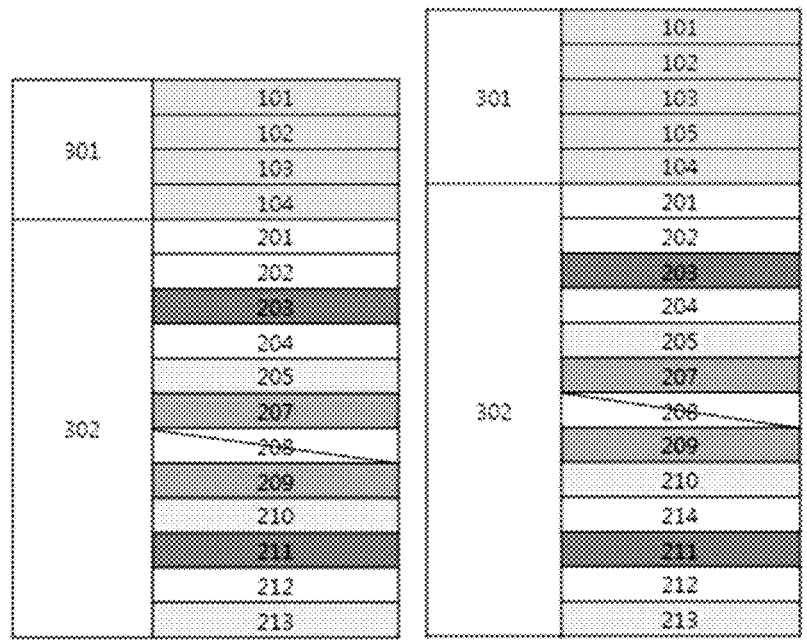

[Figure 9]
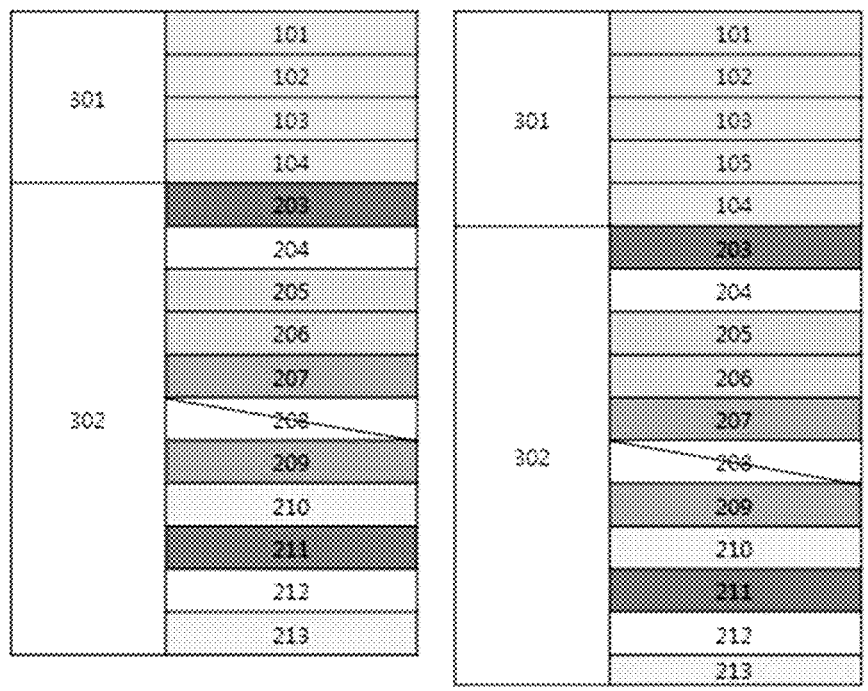
[Figure 10]
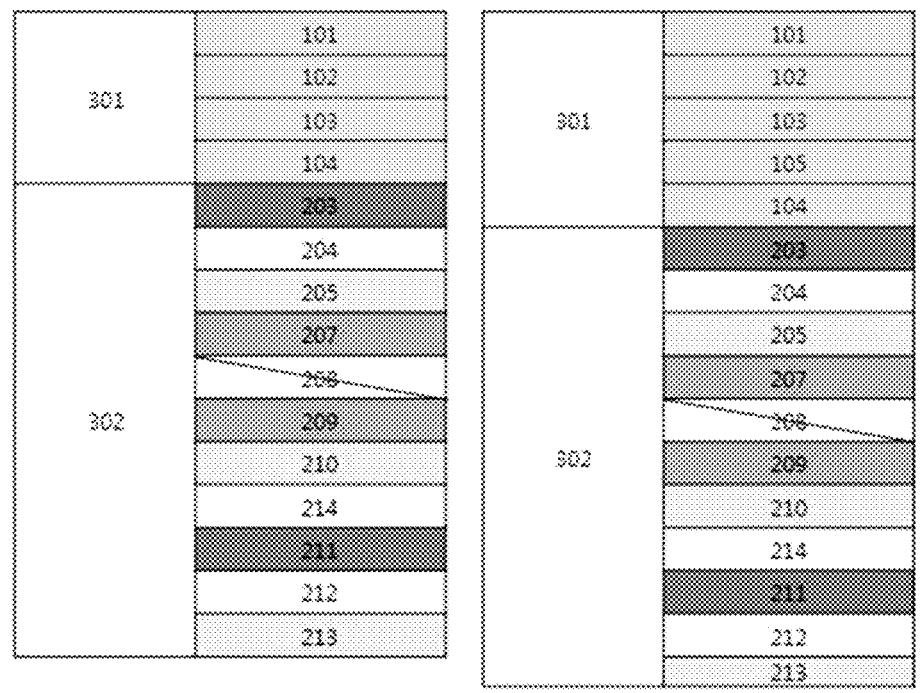

[Figure 11]
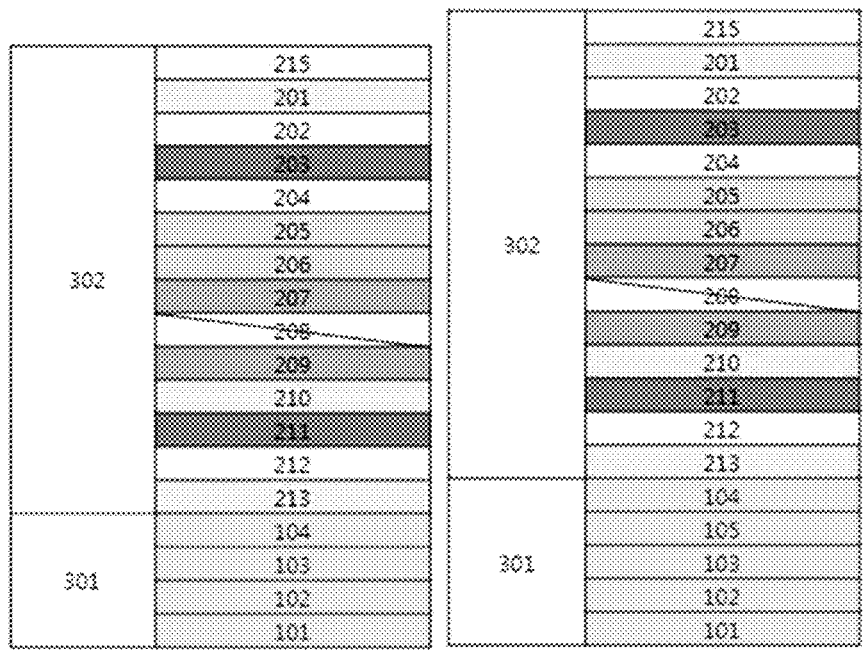
[Figure 12]
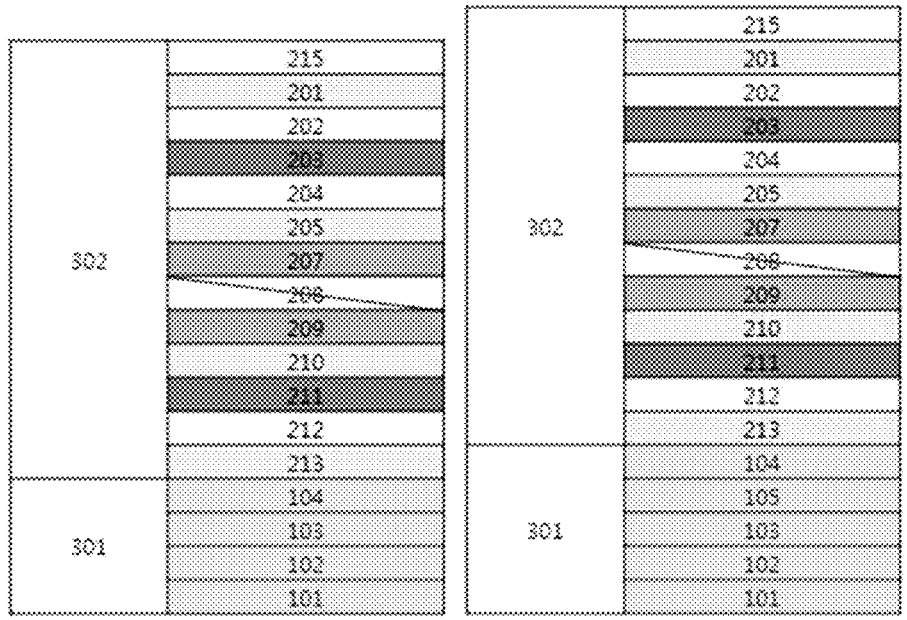

[Figure 13]
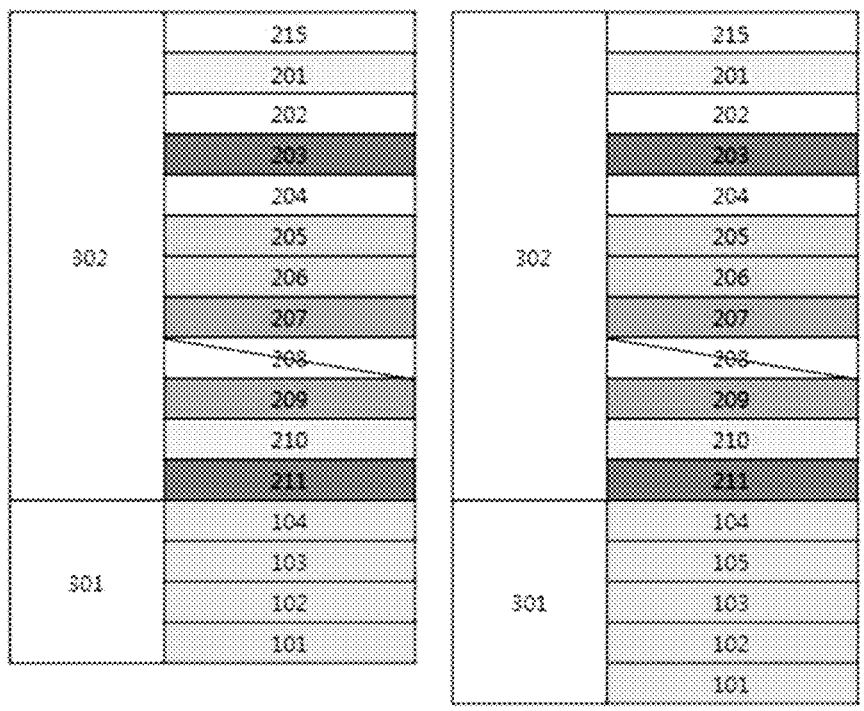
[Figure 14]
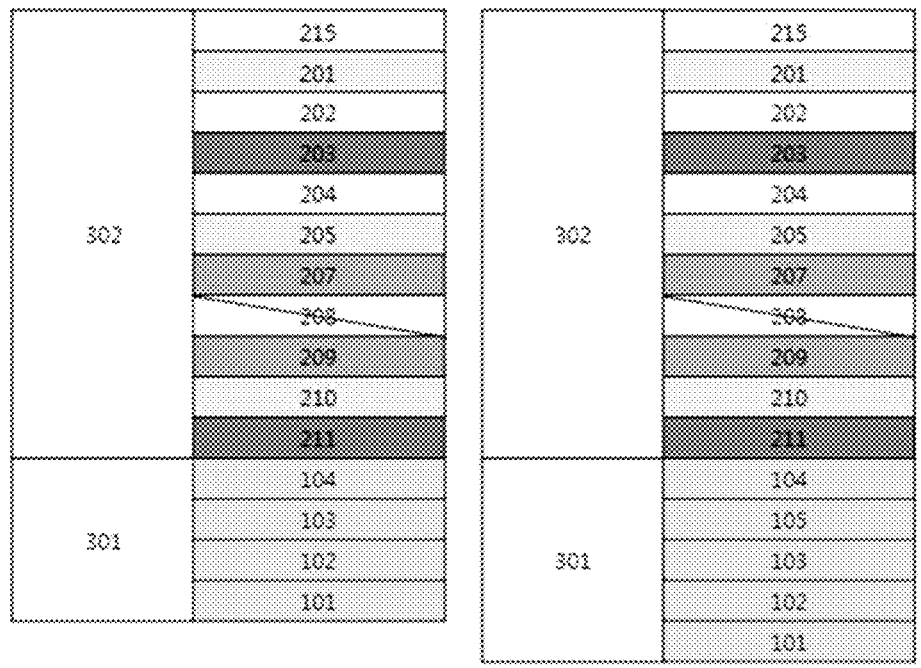

[Figure 15]
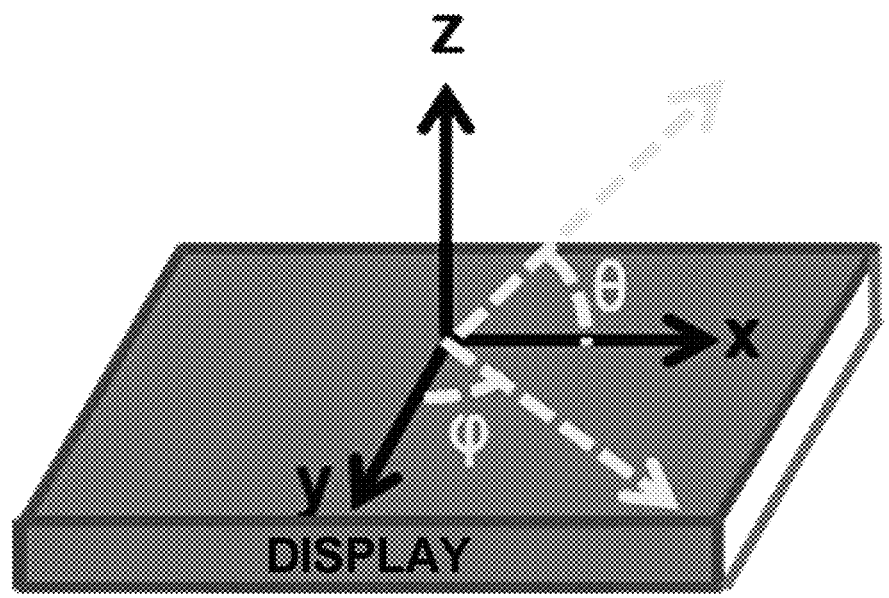
[Figure 16]
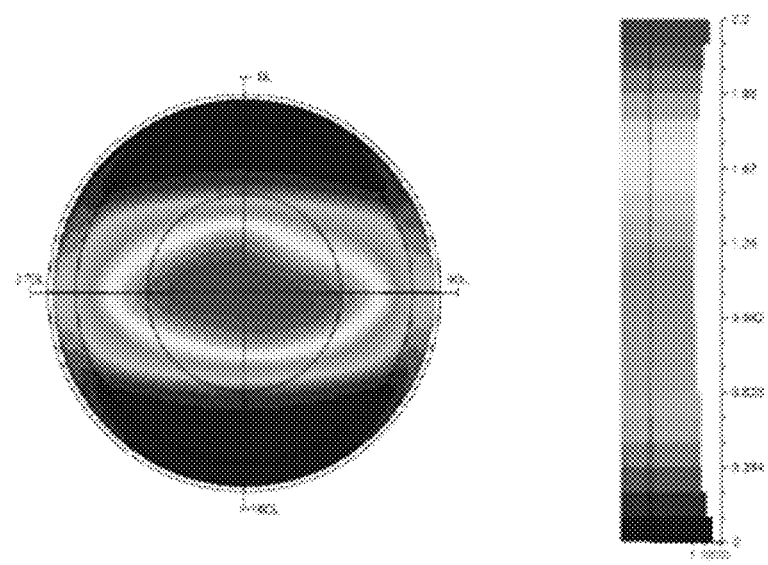

[Figure 17]
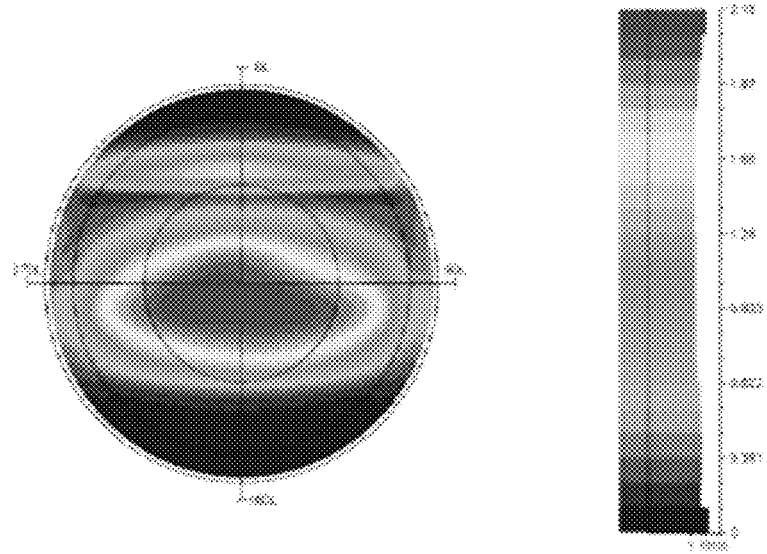
[Figure 18]
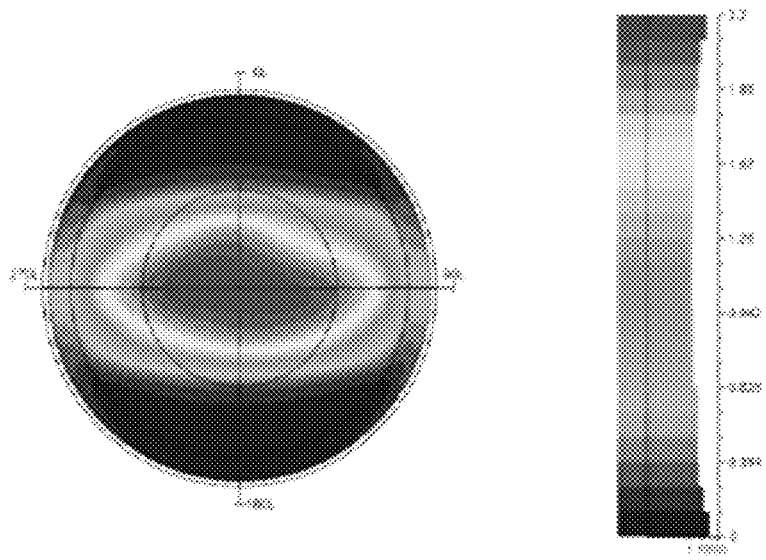

[Figure 19]
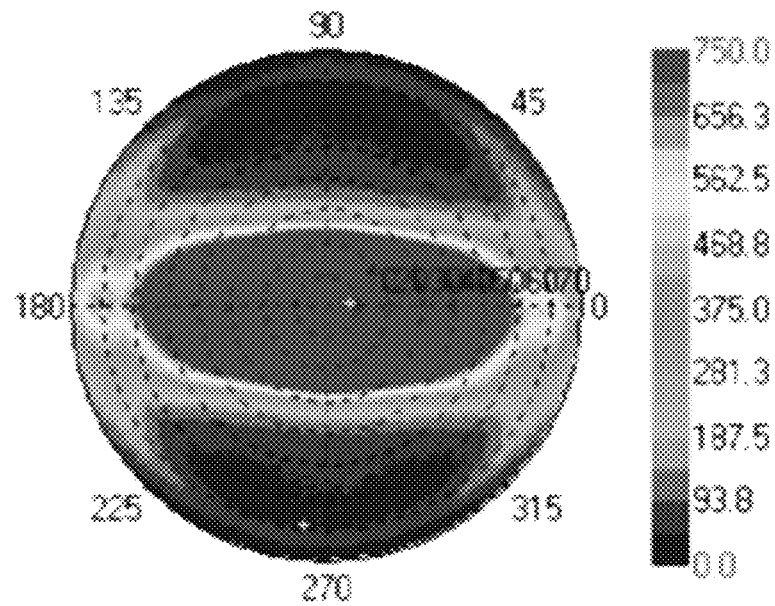
[Figure 20]
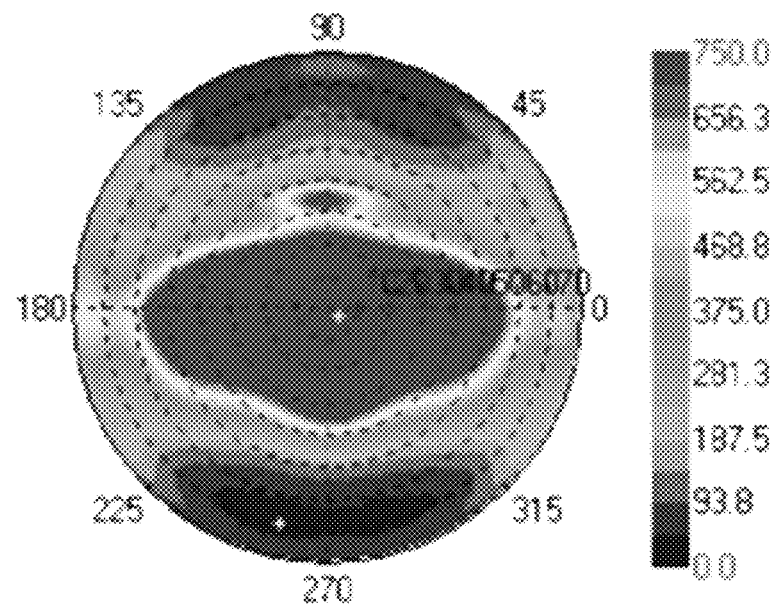

[Figure 21]
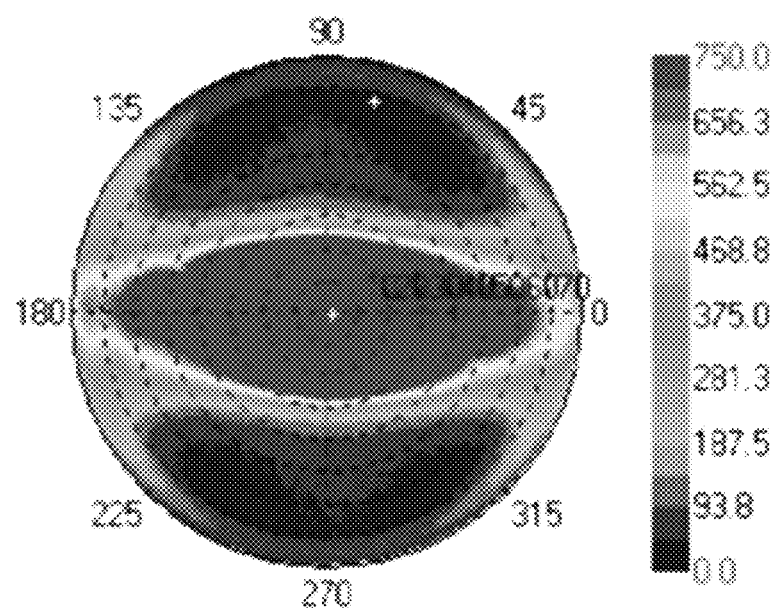
[Figure 22]
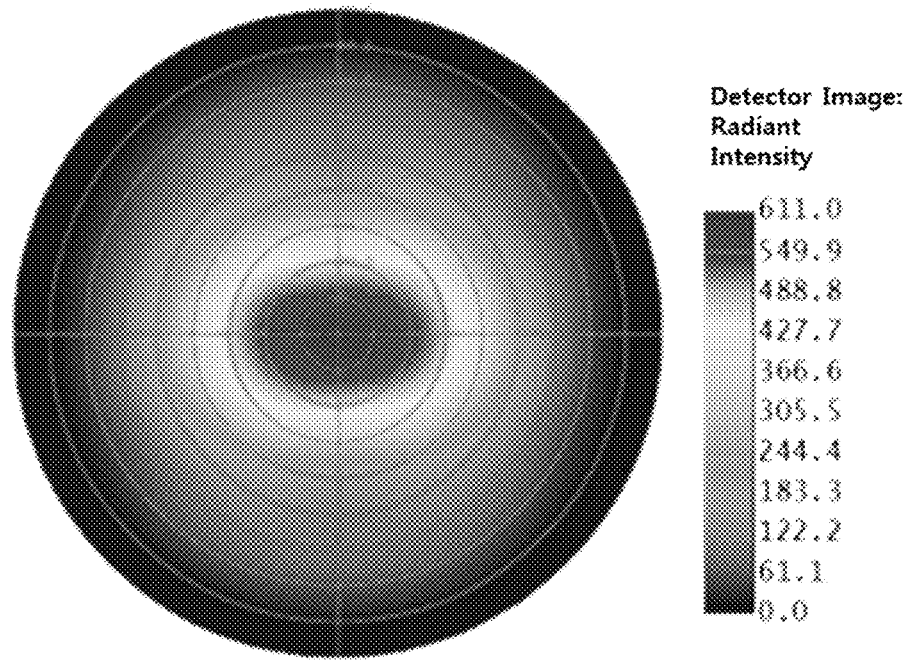

[Figure 23]
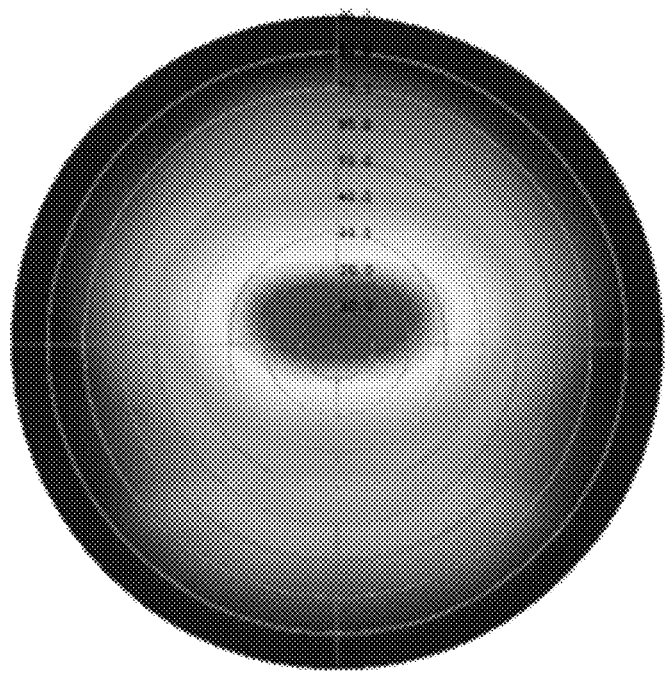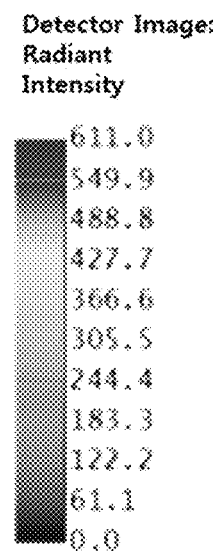
[Figure 24]
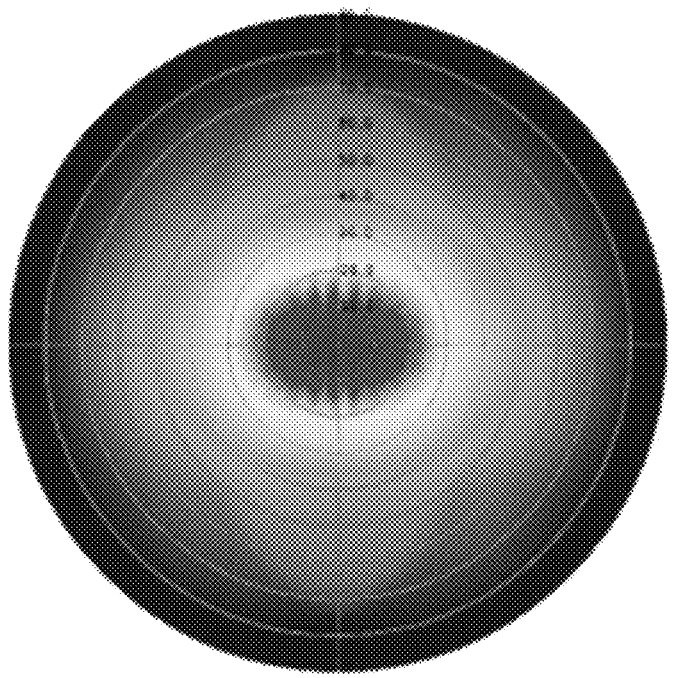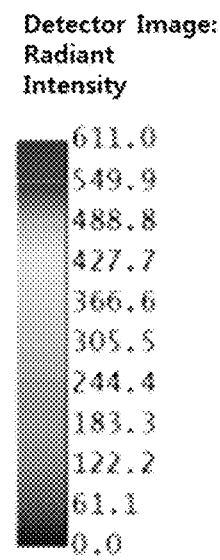

[Figure 25]
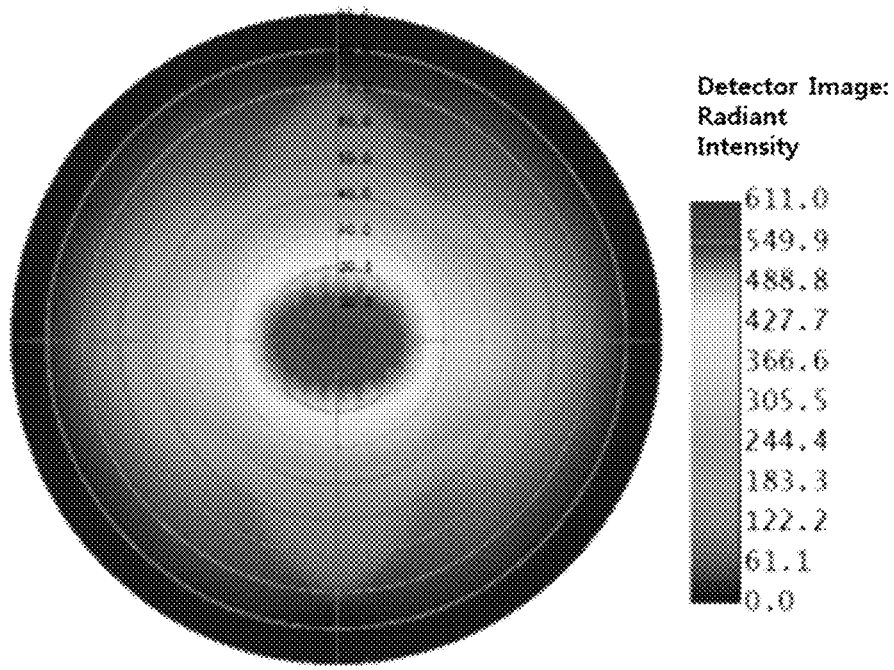
[Figure 26]
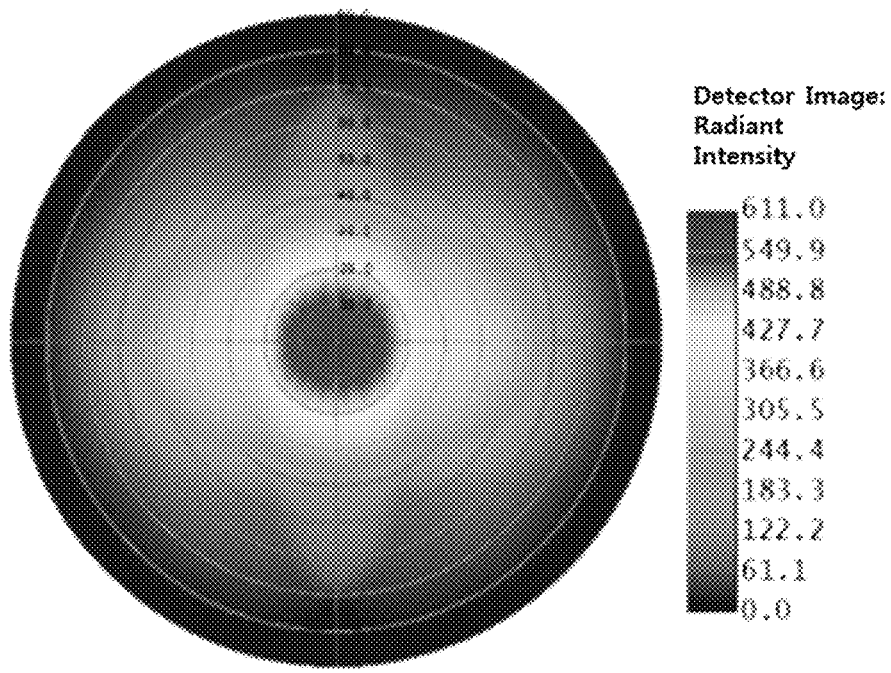

[Figure 27]
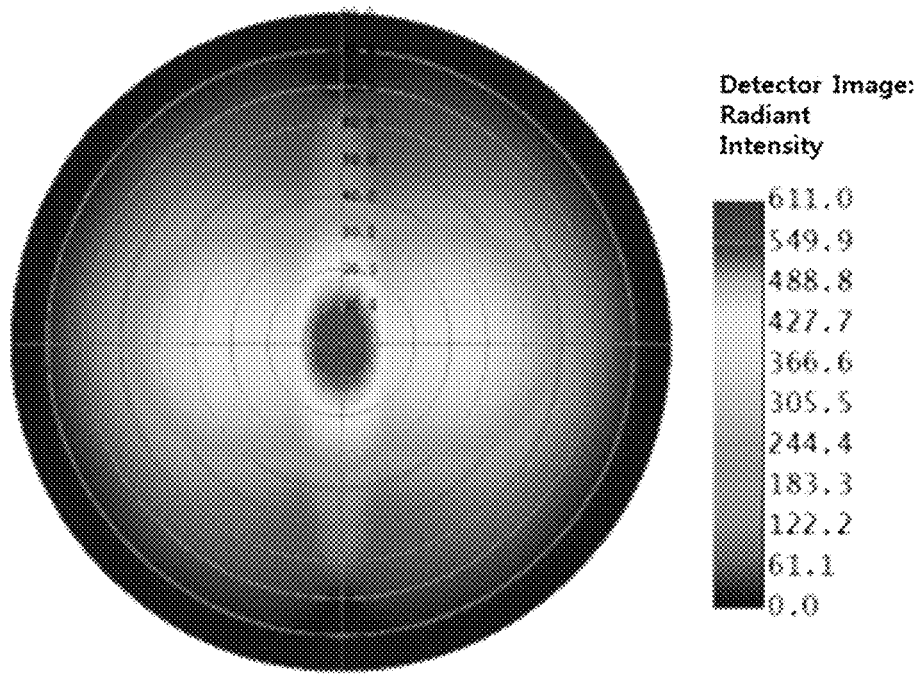

METHOD FOR MANUFACTURING VIEWING ANGLE COMPENSATION FILM, METHOD FOR MANUFACTURING POLARIZING PLATE, VIEWING ANGLE COMPENSATION FILM, POLARIZING PLATE, AND DISPLAY DEVICE INCLUDING SAME

CROSS-REFERENCE TO RELATED APPLICATIONS

This application is a National Stage Application of International Application No. PCT/KR2019/009341 filed on Jul. 26, 2019, which claims priority to Korean Patent Application No. 10-2018-0087809 filed with the Korean Intellectual Property Office on Jul. 27, 2018, the entire disclosure of which is incorporated herein by reference.

TECHNICAL FIELD

The present specification relates to a method of manufacturing a viewing angle compensation film, a method of manufacturing a polarizing plate, a viewing angle compensation film, a polarizing plate, and a display device having the same.

BACKGROUND

A liquid crystal display device is one of the flat panel displays which are widely used for mobile phones, small-sized portable electronic devices, or large-sized electronic devices such as personal computers or televisions, and the use of the liquid crystal display device is gradually being expanded.

Places and positions where the display devices are placed are diversified as the use of the display devices is expanded, but there is a problem in that it is impossible to obtain clear images when viewing the flat panel display in directions other than a direction from the front side of the flat panel display. In particular, in the case of a display for a vehicle, there is a problem in that it is impossible to obtain clear images within a driver's visual field because the position of the display and the driver's line of sight are not parallel to each other.

Therefore, there is a need for development on a display device capable of improving a viewing angle and a contrast ratio in order to solve the above-mentioned problems.

DETAILED DESCRIPTION

Technical Problem

The present specification has been made in an effort to provide a method of manufacturing a viewing angle compensation film, a method of manufacturing a polarizing plate, a viewing angle compensation film, a polarizing plate, and a display device having the same in order to provide the viewing angle compensation film and the polarizing plate which are capable of improving a contrast ratio and a viewing angle.

Technical Solution

The present invention provides a method of manufacturing a viewing angle compensation film, the method comprising: preparing a base; and forming a pattern layer on the base, in which the pattern layer comprises a first surface comprising a flat surface, and a second surface opposite to the first surface, the second surface comprises multiple protruding portions, each of the protruding portions comprises a first inclined surface and a second inclined surface, and an angle θ formed between the first inclined surface and the second inclined surface is 20° to 60°.

In addition, the present invention provides a method of manufacturing a polarizing plate, the method comprising: preparing a polarizer; and laminating, on at least one surface of the polarizer, the viewing angle compensation film manufactured by the above-mentioned manufacturing method, in which the laminating of the viewing angle compensation film comprises: applying an adhesive agent or a bonding agent onto a second surface of a pattern layer of the viewing angle compensation film; drying the viewing angle compensation film; and attaching a surface of the viewing angle compensation film, onto which the adhesive agent or the bonding agent is applied, to one surface of the polarizer.

In addition, the present invention provides a viewing angle compensation film comprising: a base; and a pattern layer formed on the base, in which the pattern layer comprises a first surface comprising a flat surface, and a second surface opposite to the first surface, the second surface comprises multiple protruding portions, each of the protruding portions comprises a first inclined surface and a second inclined surface, and an angle θ formed between the first inclined surface and the second inclined surface is 20° to 60°.

In addition, the present invention provides a polarizing plate comprising a polarizer, and the viewing angle compensation film provided on one surface of the polarizer.

In addition, the present invention provides a display device comprising the polarizing plate.

Advantageous Effects

The viewing angle compensation film manufactured by the manufacturing method according to the present invention comprises a pattern layer having a first surface having a flat surface, and a second surface opposite to the first surface, and the second surface comprises multiple protruding portions. As a result, it is possible to obtain the viewing angle compensation film with the improved contrast ratio and viewing angle, and the polarizing plate comprising the viewing angle compensation film.

BRIEF DESCRIPTION OF DRAWINGS

FIG. 1 is a view illustrating a process of forming a pattern layer according to an exemplary embodiment of the present invention.

FIG. 2 is a view illustrating a process of forming the flat layer according to the exemplary embodiment of the present invention.

FIG. 3 is a view illustrating a process of laminating a viewing angle compensation film on one surface of a polarizer according to the exemplary embodiment of the present invention.

FIG. 4 is a view illustrating a viewing angle compensation film manufactured by a manufacturing method according to the exemplary embodiment of the present invention.

FIG. 5 is an enlarged view of a pattern layer included in the viewing angle compensation film manufactured by the manufacturing method according to the exemplary embodiment of the present invention.

FIG. 6 is a view illustrating a display device comprising a polarizing plate manufactured by the manufacturing method according to the exemplary embodiment of the present invention.

FIGS. 7 to 14 are views illustrating the display device comprising the polarizing plate manufactured by the manufacturing method according to the exemplary embodiment of the present invention.

FIG. 15 is a view illustrating a viewing angle of Experimental Example 3.

FIGS. 16 to 27 are views illustrating contrast ratios C/R of Examples and Comparative Examples.

BEST MODE

Hereinafter, exemplary embodiments of the present invention will be described. However, the exemplary embodiments of the present invention can be modified in various forms, and the scope of the present invention is not limited to the following exemplary embodiments. Further, the exemplary embodiments of the present invention are provided to more completely explain the present invention to those skilled in the art.

A method of manufacturing a viewing angle compensation film according to an exemplary embodiment of the present invention comprises preparing a base and forming a pattern layer on the base. The pattern layer comprises a first surface comprising a flat surface, and a second surface opposite to the first surface. The second surface comprises multiple protruding portions. Each of the protruding portions comprises a first inclined surface and a second inclined surface, and an angle θ formed between the first inclined surface and the second inclined surface is 20° to 60°. The angle θ formed between the first inclined surface and the second inclined surface can mean an angle of a vertex formed by the first inclined surface and the second inclined surface. In a case in which the first inclined surface and the second inclined surface do not form a vertex, the angle θ can mean an angle of a vertex formed by an imaginary surface extending from the first inclined surface and an imaginary surface extending from the second inclined surface.

According to the exemplary embodiment of the present invention, the processing is disabled if the angle θ formed between the first inclined surface and the second inclined surface is smaller than 20°. If the angle θ is larger than 60°, light, which passes through the pattern layer and then is refracted, defines a concentrated form, and as a result, it is impossible to obtain an effect of improving a contrast ratio according to the present invention.

The term "inclined surface" means a vertical surface or a surface which is inclined at an angle larger than 0° and smaller than 90° based on the first surface comprising a horizontal surface or the flat surface. In addition, the "inclined surface" can mean, but not limited to, a flat surface.

In the method of manufacturing a viewing angle compensation film according to the exemplary embodiment of the present invention, the forming of the pattern layer can be performed by, but not limited to, an imprinting method.

FIG. 1 is a view illustrating the forming of the pattern layer on the base according to the exemplary embodiment of the present invention. First, ultraviolet curable resin is applied onto a mold by using a pre-gap roll, and a primary curing process is performed by emitting UV rays at the moment when or immediately after the base, which moves along the mold, and the rotating mold come into contact with each other, such that the ultraviolet curable resin is transferred onto the base. Thereafter, a secondary curing process is performed by emitting the UV rays, such that the pattern layer is formed on the base.

The forming of the pattern layer by using the imprinting method is performed not only by applying the ultraviolet curable resin onto the mold, but also by performing the primary curing process, after applying the ultraviolet curable resin onto the base, to transfer the ultraviolet curable resin onto the base by moving the base, onto which the ultraviolet curable resin is applied, along the rotating mold and emitting the UV rays at the moment when or immediately after the base and the mold come into contact with each other. Thereafter, the secondary curing process can be performed.

Here, the base can be, but not limited to, a film made of polyester, polyacrylic, polyvinyl chloride, polycarbonate, polymethyl methacrylate, polystyrene, polyester sulfone, polybutadiene, triacetate cellulose (TAC), cycloolefin polymer (COP), polyethylene terephthalate (PET), or acrylic, or the like.

The acrylic-based film can comprise (meth)acrylate-based resin, and the film comprising the (meth)acrylate-based resin can be obtained by molding a moldable material comprising the (meth)acrylate-based resin as a main ingredient through extrusion molding.

The acrylic-based film can be a film comprising a copolymer containing an alkyl (meth)acrylate-based unit and a styrene-based unit and an aromatic resin having a carbonate residue in the main chain, or a film comprising an alkyl (meth)acrylate-based unit, a styrene-based unit, a 3 to 6-membered heterocyclic unit having a functional group substituted with at least one carbonyl group, and a vinyl cyanide unit. In addition, the acrylic-based film can be made of acrylic resin having a lactone structure.

For example, specific examples of the acrylic-based resin having the lactone structure can comprise (meth)acrylate-based resin having a lactone ring structure disclosed in Japanese Patent Application Laid-Open No. 2000-230016, Japanese Patent Application Laid-Open No. 2001-151814, and Japanese Patent Application Laid-Open No. 2002-120326.

Examples of the aromatic-based resin can comprise a resin composition disclosed in Korean Patent Application Laid-Open No. 10-2009-0115040 and comprising: (a) a (meth)acrylate-based unit containing at least one (meth) acrylate-based derivative; (b) an aromatic unit comprising an aromatic residue and a chain containing a hydroxyl group-containing residue; and (c) a styrene-based unit comprising at least one styrene-based derivative. The units of (a) to (c) can also be each included in the form of a separate copolymer in the resin composition, and two or more units among the units of (a) to (c) can also be included in the form of one copolymer in the resin composition.

A method of manufacturing the acrylate-based film is not particularly limited, and for example, the acrylate-based resin film can be prepared by sufficiently mixing a (meth) acrylate-based resin, other polymers, additives, and the like by any appropriate mixing method to prepare a thermoplastic resin composition, and then film-molding the thermoplastic resin composition, or by preparing a separate solution of other polymers, additives, and the like and mixing a (meth)acrylate-based resin with the separate solution to form a uniform mixture solution, and then film-molding the mixture.

The thermoplastic resin composition can, for example, be prepared by pre-blending film raw materials by using any suitable mixing machine such as an Omni mixer and extruding and kneading the resulting mixture. In this case, the mixing machine used for the extrusion and kneading is not particularly limited. For example, any suitable mixing machine such as an extruder, for example, a single-screw extruder or a double-screw extruder, or a dispersion kneader, can be used herein.

Examples of the method of molding a film can comprise any suitable film molding method such as a solution casting method (i.e., a solution softening method), a melt extrusion method, a calendar method, an extrusion molding method, and the like. The solution casting method (i.e., the solution softening method) and the melt extrusion method are preferable, but the present invention is not limited thereto.

A solvent used in the solution casting method (i.e., the solution softening method) can, for example, comprise aromatic hydrocarbons such as benzene, toluene, and xylene; aliphatic hydrocarbons such as cyclohexane, and decalin; esters such as ethyl acetate, and butyl acetate; ketones such as acetone, methyl ethyl ketone, and methylisobutylketone; alcohols such as methanol, ethanol, isopropanol, butanol, isobutanol, methyl cellosolve, ethyl cellosolve, and butyl cellosolve; ethers such as tetrahydrofuran, and dioxane; halogenated hydrocarbons such as dichloromethane, chloroform, and carbon tetrachloride; dimethylformamide; dimethylsulfoxide, and the like. Here, the above-described solvents can be used alone or in a combination of two or more thereof.

Examples of an apparatus for performing the solution casting method (i.e., the solution softening method) can comprise a drum-type casting machine, a band-type casting machine, a spin coater, and the like. Examples of the melt extrusion method can comprise a T-die method, an inflation method, and the like. A molding temperature can be, but not limited to, specifically 150 to 350° C., and more specifically, 200 to 300° C.

When a film is molded using the T-die method, a roll-shaped film can be obtained by installing a T-die at a leading end of a known single-screw or double-screw extruder and winding a film extruded in the form of a thin film. In this case, uniaxial stretching can be performed by properly adjusting the temperature of a winding roll and stretching the film in an extrusion direction. Also, simultaneous and sequential biaxial stretching can be performed by stretching the film in a direction perpendicular to the extrusion direction.

The acrylic-based film can be either a non-stretched film or a stretched film. In this case, the stretched film can be either a uniaxially stretched film or a biaxially stretched film, and the biaxially stretched film can be either a simultaneously biaxially stretched film or a sequentially biaxially stretched film. When the film is biaxially stretched, the performance of the film can be improved due to improved mechanical strength. Even when the acrylic-based film is stretched by blending another thermoplastic resin, it is possible to suppress an increase in phase difference and maintain optical isotropy.

The stretching temperature is preferably within a range near the glass transition temperature of the thermoplastic resin composition that is a raw material of a film. Preferably, the stretching temperature is in a range of (a glass transition temperature of −30° C.) to (a glass transition temperature of +100° C.), and more preferably in a range of (a glass transition temperature of −20° C.) to (a glass transition temperature of +80° C.). There is concern that sufficient stretching magnification may not be obtained when the stretching temperature is less than (a glass transition temperature of −30° C.). On the other hand, there is concern that stable stretching may not be achieved due to the flowing of the resin composition when the stretching temperature exceeds (a glass transition temperature of +100° C.).

When the stretching magnification is defined as an area ratio, the stretching magnification can preferably be in a range of 1.1 to 25 times, and more preferably 1.3 to 10 times. There is concern that improvements in toughness involved in the stretching may not be realized when the stretching magnification is less than 1.1 times. There is concern that effects may not occur in an amount equal to an increase in the stretching magnification when the stretching magnification exceeds 25 times.

The stretching rate in a single direction is preferably in a range of 10 to 20,000%/min, and more preferably in a range of 100 to 10,000%/min. There is concern that when the stretching rate is less than 10%/min, a time required to reach sufficient stretching magnification can be lengthened, resulting in an increase in manufacturing costs. There is concern that the stretched film can be broken when the stretching rate exceeds 20,000%/min.

The acrylic-based film can be subjected to a thermal treatment (annealing) after the stretching in order to stabilize the optical isotropy or mechanical characteristics. The thermal treatment conditions are not particularly limited, and thus any proper conditions known in the related art can be used herein.

According to one exemplary embodiment of the present invention, a coating layer such as the anti-glare (AG) layer, the hard coating (HC) layer, the low refractive index (LR) layer, the AGLR (anti-glare & low-reflection), the anti-reflection (AR) layer, or the like can be formed on at least one surface of the base. In this case, coating compositions for forming the layers can be used to form the layers by a method well known in the art, for example, a bar coating method, a gravure coating method, or a slot-die coating method. Although the drying process can be performed through a convection oven and the like, the drying process is not limited thereto, and is performed preferably at a temperature of 100° C. to 120° C. for 1 minute to 5 minutes. The drying temperature varies according to steps of coating the composition, and in case of a stretching-completed film, the drying process can be performed in a range in which the drying temperature does not exceed a glass transition temperature (Tg) of the film, and in the case of comprising the stretching process, the drying process can be performed at a stretching temperature at the same time as the stretching process, and the drying process is performed in a range in which the drying temperature does not exceed a decomposition temperature (Td) of the film.

A coating composition for forming the pattern layer can comprise, but is not limited to, an ultraviolet curable resin. Examples of the ultraviolet curable resin can comprise, but are not limited to, epoxy (meth)acrylate, urethane (meth)acrylate, phenylphenol ethoxylated (meth)acrylate, trimethylolpropane ethoxylated (meth)acrylate, phenoxybenzyl (meth)acrylate, phenylphenoxyethyl (meth)acrylate, ethoxylated thiodiphenyl di(meth)acrylate, phenylthioethyl (meth)acrylate monomer or oligomer thereof, or fluorene derivative unsaturated resin. A ketone-based photoinitiator, a phosphine oxide-based photoinitiator, a triazine-based photoinitiator, an acetophenone-based photoinitiator, and a benzophenone-based photoinitiator can be used as the photoinitiator, but the present invention is not limited thereto.

The coating composition can further comprise the photoinitiator. The photoinitiator can be present in an amount of 0.01 part by weight to 10 parts by weight, preferably, 0.1 part by weight to 5 parts by weight based on 100 parts by weight of the ultraviolet curable resin.

The coating composition can further comprise a solvent, and the solvent can be an alcohol-based solvent, a ketone-based solvent, an ether-based solvent, a hexane-based solvent, or a benzene-based solvent. More specifically, the solvent can be, but is not limited to, at least one solvent selected from a group consisting of methanol, ethanol, isopropanol, 2-methoxyethanol, butanol, isooctanol, methyl cellosolve, ethyl cellosolve, isopropyl cellosolve, butyl cellosolve, methyl carbitol, ethyl carbitol, isopropyl carbitol, butyl carbitol, acetone, methyl ethyl ketone, methyl butyl ketone, methyl isobutyl ketone, diethyl ketone, dipropyl ketone, dibutyl ketone, cyclohexanone, methyl acetate, ethyl acetate, butyl acetate, hexane, heptane, octane, benzene, toluene, and xylene.

The coating composition can further comprise, as additives, an antioxidant, an UV absorbent, a light stabilizer, a leveling agent, a surfactant, a lubricant, and the like, and the additives can be present in an amount of 0.001 part by weight to 5 parts by weight with respect to the total amount of the coating composition.

The amount of ultraviolet rays to be emitted during the primary curing process and the secondary curing process in the forming of the pattern layer is about 0.01 to 2 J/cm$^2$, preferably, 0.1 to 1 J/cm$^2$, and more preferably, 0.2 to 0.5 J/cm$^2$.

The method of manufacturing a viewing angle compensation film according to the exemplary embodiment of the present invention further comprises forming a flat layer on the second surface of the pattern layer.

The forming of the flat layer can be performed by, but is not limited to, an imprinting method.

FIG. 2 is a view illustrating the forming of the flat layer on the second surface of the pattern layer of the viewing angle compensation film according to the exemplary embodiment of the present invention. First, ultraviolet curable resin for forming the flat layer is applied onto a mold by using a pre-gap roll, and a primary curing process is performed by emitting UV rays at the moment when or immediately after the base, on which the pattern layer is formed and which moves along the mold, and the mold come into contact with each other, such that the ultraviolet curable resin is transferred onto the pattern layer. Thereafter, a secondary curing process is performed by emitting the UV rays, such that the flat layer is formed on the pattern layer.

The forming of the flat layer by using the imprinting method is performed not only by applying the ultraviolet curable resin onto the mold, but also by performing the primary curing process, after applying the ultraviolet curable resin onto the pattern layer, to transfer the ultraviolet curable resin onto the pattern layer by moving the base having the pattern layer, onto which the ultraviolet curable resin is applied, along the rotating mold and emitting the UV rays at the moment when or immediately after the pattern layer and the mold come into contact with each other. Thereafter, the secondary curing process can be performed.

The flat layer comprises the ultraviolet curable resin, and a thickness of the flat layer can be (height of pattern layer*X), wherein X is 1 to 50.

The method according to the exemplary embodiment of the present invention can further comprise forming one or more optical layers on the flat layer. The optical layer can be, but not limited to, an anti-glare (AG) layer, a hard coating (HC) layer, a low refractive index (LR) layer, an AGLR (anti-glare & low-reflection), an anti-reflection (AR) layer, or the like.

The hard coating layer, the anti-glare (AG) layer, the low refractive index (LR) layer, the AGLR (anti-glare & low-reflection), and the anti-reflection (AR) layer can be made of a material of a primer layer which is used for general purposes. A thickness of each of the hard coating layer, the anti-glare (AG) layer, the low refractive index (LR) layer, the AGLR (anti-glare & low-reflection), and the anti-reflection (AR) layer can be 1 to 100 μm.

The angle θ formed between the first inclined surface and the second inclined surface can be 20° to 60°, and as in another example, 30° to 50° or 40° to 50°. When the angle θ formed between the first inclined surface and the second inclined surface satisfies the range, a refraction angle of the light incident on the viewing angle compensation film can be adjusted, such that it is possible to adjust a viewing angle of a manufactured display device comprising the viewing angle compensation film.

The angle θ formed between the first inclined surface and the second inclined surface can be an angle formed by the first inclined surface and the second inclined surface in a case in which the first inclined surface and the second inclined surface adjoin each other. In a case in which the first inclined surface and the second inclined surface do not adjoin each other, the angle θ can be an angle formed by a line extending from the first inclined surface and a line extending from the second inclined surface.

The protruding portion can have a cross section having an asymmetric structure. The "cross section having an asymmetric structure" means that a figure formed along a rim of a cross section has a structure that does not have line symmetry or point symmetry. The line symmetry refers to a property in which parts of any figure overlap each other when the figure is symmetric about a straight line. The point symmetry means a property in which when any figure is rotated about a point by 180 degrees, the figure completely overlaps an original figure. Here, a rim of the cross section having the asymmetric structure can have a straight shape, a curved shape, or a combination thereof.

At least one of the cross sections of the asymmetric structure comprises two or more sides having different inclination angles, different bending degrees, or different shapes. For example, in a case in which the two sides, among the sides that constitute at least one cross section, have different inclination angles, different bending degrees, and different shapes, the protruding portion has an asymmetric structure.

The rim of the cross section having the asymmetric structure can have a straight shape, a curved shape, or a combination thereof.

As described above, since the protruding portion comprises the cross section having the asymmetric structure, it is possible to improve the viewing angle and the contrast ratio.

As an example of the cross section having the asymmetric structure, an angle $θ_1$ formed between the first inclined surface and the horizontal line and an angle $θ_2$ formed between the second inclined surface and the horizontal line can be different from each other. In this way, it is possible to improve the viewing angle and the contrast ratio by adjusting a refraction angle of the light incident on the pattern layer.

The angle $θ_1$ formed between the first inclined surface and the horizontal line can be defined as a first inclination angle, and the angle $θ_2$ formed between the second inclined surface and the horizontal line can be defined as a second inclination angle. The "inclination angle" is an angle formed between a surface or side of the protruding portion and the ground surface when the viewing angle compensation film is placed on the ground surface, and the inclination angle is larger than 0 degrees and smaller than 90 degrees. Alternatively, the inclination angle can mean an angle formed between the ground surface and a line segment (a'-b') formed by connecting a point a' at which the surface or side of the protruding portion adjoins the ground surface and a point b' at which the surface of side of the protruding portion is most distant from the ground surface.

A difference between the angle $\theta_1$ formed between the horizontal line and the first inclined surface of the protruding portion and the angle formed between the horizontal line and the second inclined surface can be 30 degrees to 70 degrees. A difference between the inclination angle of the first inclined surface and the inclination angle of the second inclined surface can be, for example, 30 degrees or more, 33 degrees or more, 35 degrees or more, or 37 degrees or more, to 70 degrees or less, 65 degrees or less, 60 degrees or less, or 55 degrees or less. The difference within the range can be advantageous in terms of implementing a contrast ratio in a direction.

According to one exemplary embodiment of the present invention, the multiple protruding portions provided on the second surface can be continuously arranged. In the case in which the multiple protruding portions are continuously provided, the pattern layer is formed such that the first inclined surface of one protruding portion and the first inclined surface or the second inclined surface of the other protruding portion are in contact with each other.

According to another exemplary embodiment, the multiple protruding portions may not be continuously provided. The configuration in which the multiple protruding portions are not continuously provided means that there are flat portions provided between the multiple protruding portions and the inclined surfaces of the protruding portions are not in contact with each other.

The protruding portion can have a protruding portion unit shape. The protruding portion unit shape is a shape comprising two inclined sides, but is not a shape comprising three or more inclined sides. The first inclined side can be defined as a left inclined surface of a convex portion unit illustrated in FIG. 5, and the second inclined side can be defined as a right inclined surface of the convex portion unit illustrated in FIG. 5.

According to the exemplary embodiment of the present invention, at least one cross section perpendicular to the first surface of the protruding portion can have a triangular or quadrangular shape. The "cross section" means a section made by cutting the protruding portion in any one direction. For example, the cross section can mean a section made by cutting the protruding portion in a direction perpendicular to the ground surface or a direction parallel to the ground surface when the viewing angle compensation film is placed on the ground surface. Specifically, the cross section can mean a cross section, which is formed in a direction in which the multiple protruding portions are arranged, among the cross sections perpendicular to the first surface.

In a case in which at least one cross section perpendicular to the first surface of the protruding portion has a triangular shape, the triangular shape comprises a first inclined side and a second inclined side. The first inclined side and the second inclined side mean line segments of the cross sections of the first inclined surface and the second inclined surface.

In the case in which at least one cross section perpendicular to the first surface has a triangular shape, an end of the first inclined surface and an end of the second inclined surface are positioned to be in contact with the first surface. In this case, the angle formed between the first inclined surface and the horizontal line is $\theta_1$, the angle formed between the second inclined surface and the horizontal line is $\theta_2$, and the angle $\theta_1$ formed between the first inclined surface and the horizontal line and the angle $\theta_2$ formed between the second inclined surface and the horizontal line can be different from each other. Since the angle θ1 formed between the first inclined surface and the horizontal line and the angle θ2 formed between the second inclined surface and the horizontal line have different values, it is possible to adjust the refraction angle of the light incident on the pattern layer.

In the case in which at least one cross section perpendicular to the first surface of the protruding portion has a quadrangular shape, the quadrangular shape can be a general quadrangular shape and is not particularly limited as long as the respective inclined sides have different inclination angles. Specifically, the quadrangular shape can be a shape remaining after partially cutting a triangle. For example, the quadrangular shape can be a trapezoidal shape which is a quadrangular shape having a pair of parallel opposite sides, or a quadrangular shape having no pair of parallel opposite sides. The remaining portion after cutting a part of the triangle can be called a third inclined surface.

An angle $\theta_3$ formed between the third inclined surface and the horizontal line can be defined as a third inclination angle. The first inclination angle, the second inclination angle, and the third inclination angle can be different from one another. In this way, it is possible to adjust the refraction angle of the light incident on the pattern layer.

A height h of the pattern layer is a vertical distance between the first surface and a tip of the protruding portion or is a distance which has a greatest value among vertical distances between the first surface, the first inclined surface, and the third inclined surface in a case in which the protruding portion has the first to third inclined surfaces. The height h of the pattern layer can be 1 to 500 μm.

A refraction angle of the light passing through the pattern layer of the viewing angle compensation film can be 1° to 20°. According to another exemplary embodiment, the refraction angle can be 3° to 15°.

A method of manufacturing a polarizing plate according to the exemplary embodiment of the present invention comprises preparing a polarizer, and laminating the viewing angle compensation film, which is manufactured by the manufacturing method, on at least one surface of the polarizer. The laminating of the viewing angle compensation film comprises applying an adhesive agent or a bonding agent onto the second surface of the pattern layer of the viewing angle compensation film, drying the viewing angle compensation film, and attaching the surface of the viewing angle compensation film, onto which the adhesive agent or the bonding agent is applied, to one surface of the polarizer.

FIG. 3 is a view illustrating a process of laminating the viewing angle compensation film on one surface of the polarizer according to the exemplary embodiment of the present invention. The adhesive agent or the bonding agent is applied onto the second surface of the viewing angle compensation film manufactured by the method of manufacturing a viewing angle compensation film, the drying process is performed, and then the surface of the viewing angle compensation film onto which the adhesive agent or the bonding agent is applied is attached to one surface of the polarizer. A surface treatment can be performed on one surface of the polarizer before the viewing angle compensation film is attached to one surface of the polarizer, and examples of the surface treatment can comprise, for example, a corona treatment, a plasma treatment, or the like.

A thickness of the adhesive layer can be 1 to 200 μm, and the adhesive layer can be an adhesive agent for the general purpose.

A thickness of the bonding layer can be 1 to 100 μm, and the bonding layer can be a bonding agent for the general purpose.

A drying temperature in the drying step can be 50° C. to 120° C., preferably, 60° C. to 100° C.

In addition, a drying time in the drying step can be 1 minute to 5 minutes, preferably, 2 minutes to 3 minutes.

In the drying step, the drying temperature and the drying time need to be satisfied to cure the adhesive agent or the bonding agent, and the adhesive agent or the bonding agent is not cured when the drying temperature and the drying time are not satisfied. In addition, according to the exemplary embodiment of the present invention, the drying process can be performed by slowly applying heat at 60° C. to 100° C.

The process of laminating the viewing angle compensation film on one surface of the polarizer can further comprise curing the adhesive agent or the bonding agent by irradiating the adhesive agent or the bonding agent with UV rays. Specifically, the adhesive agent or the bonding agent is applied onto the second surface of the viewing angle compensation film manufactured by the method of manufacturing a viewing angle compensation film, the drying process is performed, the surface of the viewing angle compensation film onto which the adhesive agent or the bonding agent is applied is attached to one surface of the polarizer, and then the curing process can be additionally performed. However, the present invention is not limited thereto, but the processes can be performed once or two or more times with about 30 Watt to 50 Watt.

A viewing angle compensation film manufactured by the method of manufacturing a viewing angle compensation film according to the present invention is specifically described below.

FIG. 4 is a view illustrating a viewing angle compensation film manufactured by the manufacturing method according to the exemplary embodiment of the present invention. The viewing angle compensation film illustrated in FIG. 4 comprises a base film 10 and a pattern layer 11. FIG. 5 is an enlarged view of the pattern layer included in the viewing angle compensation film manufactured by the manufacturing method according to an exemplary embodiment of the present invention.

The present invention provides a viewing angle compensation film comprising a pattern layer formed on a base. The pattern layer comprises a first surface comprising a flat surface, and a second surface opposite to the first surface. The pattern layer comprises the second surface comprising multiple protruding portions. Each of the protruding portions comprises a first inclined surface and a second inclined surface, and an angle θ formed between the first inclined surface and the second inclined surface is 20° to 60°. The viewing angle compensation film can be manufactured by the above-mentioned method.

The present invention provides a polarizing plate comprising a polarizer, and the viewing angle compensation film provided on one surface of the polarizer. The polarizing plate is specifically described below.

In addition, the present invention provides a display device comprising the polarizing plate. The display device is specifically described below.

FIG. 6 is a view illustrating a display device comprising a polarizing plate manufactured by a manufacturing method according to an exemplary embodiment of the present invention.

FIGS. 7 to 14 are views illustrating the display device comprising the polarizing plate manufactured by a manufacturing method according to an exemplary embodiment of the present invention.

The display device illustrated in FIG. 7 comprises a structure in which a viewing angle compensation film having a coating layer 101, a base 102, and a pattern layer 103 stacked in this order is attached, by an adhesive agent or a bonding agent 104, to an upper side of an advanced true-wide (ATW) polarizing plate having a fourth protective film 213, a third bonding layer 212, a polarizer (PVA) 211, a third protective film 210, a second adhesive layer 209, a liquid crystal cell 208, a first adhesive layer 207, liquid crystal 206, a second protective film 205, a second bonding layer 204, a polarizer (PVA) 203, a first bonding layer 202, and a first protective film 201 stacked in this order. The display device comprises a structure in which a viewing angle compensation film having the coating layer 101, the base 102, the pattern layer 103, and a flat layer 105 stacked in this order is attached, by an adhesive agent or a bonding agent 104, to an upper side of an advanced true-wide (ATW) polarizing plate comprising the fourth protective film 213, the third bonding layer 212, the polarizer (PVA) 211, a fourth bonding layer 214, the third protective film 210, the second adhesive layer 209, the liquid crystal cell 208, the first adhesive layer 207, the liquid crystal 206, the second protective film 205, the second bonding layer 204, the polarizer (PVA) 203, the first bonding layer 202, and the first protective film 201 stacked in this order.

The display device illustrated in FIG. 8 comprises a structure in which a viewing angle compensation film having the coating layer 101, the base 102, and the pattern layer 103 stacked in this order is attached, by the adhesive agent or the bonding agent 104, to an upper side of a polarizing plate having the fourth protective film 213, the third bonding layer 212, the polarizer (PVA) 211, the third protective film 210, the second adhesive layer (209), the liquid crystal cell 208, the first adhesive layer 207, the second protective film 205, the second bonding layer 204, the polarizer (PVA) 203, the first bonding layer 202, and the first protective film 201 stacked in this order. The display device comprises a structure in which a viewing angle compensation film having the coating layer 101, the base 102, the pattern layer 103, and the flat layer 105 stacked in this order is attached, by the adhesive agent or the bonding agent 104, to an upper side of a polarizing plate having the fourth protective film 213, the third bonding layer 212, the polarizer (PVA) 211, the fourth bonding layer 214, the third protective film 210, the second adhesive layer 209, the liquid crystal cell 208, the first adhesive layer 207, the second protective film 205, the second bonding layer 204, the polarizer (PVA) 203, the first bonding layer 202, and the first protective film 201 stacked in this order.

The display device illustrated in FIG. 9 comprises a structure in which a viewing angle compensation film having the coating layer 101, the base 102, and the pattern layer 103 stacked in this order is attached, by the adhesive agent or the bonding agent 104, to an upper side of an advanced true-wide (ATW) polarizing plate having the fourth protective film 213, the third bonding layer 212, the polarizer (PVA) 211, the third protective film 210, the second adhesive layer 209, the liquid crystal cell 208, the first adhesive layer 207, the liquid crystal 206, the second protective film 205, the second bonding layer 204, and the polarizer (PVA) 203 stacked in this order. The display device comprises a structure in which a viewing angle compensation film having the coating layer 101, the base 102, the pattern layer 103, and the flat layer 105 stacked in this order is attached, by the adhesive agent or the bonding agent 104, to an upper side of an advanced true-wide (ATW) polarizing plate having the fourth protective film 213, the third bonding layer 212, the polarizer (PVA) 211, the third protective film 210, the second adhesive layer 209, the liquid crystal cell 208, the first adhesive layer 207, the liquid crystal 206, the second protective film 205, the second bonding layer 204, and the polarizer (PVA) 203 stacked in this order.

The display device illustrated in FIG. 10 comprises a structure in which a viewing angle compensation film having the coating layer 101, the base 102, and the pattern layer 103 stacked in this order is attached, by the adhesive agent or the bonding agent 104, to an upper side of a polarizing plate having the fourth protective film 213, the third bonding layer 212, the polarizer (PVA) 211, the fourth bonding layer 214, the third protective film 210, the second adhesive layer 209, the liquid crystal cell 208, the first adhesive layer 207, the second protective film 205, the second bonding layer 204, and the polarizer (PVA) 203 stacked in this order. The display device comprises a structure in which a viewing angle compensation film having the coating layer 101, the base 102, the pattern layer 103, and the flat layer 105 stacked in this order is attached, by the adhesive agent or the bonding agent 104, to an upper side of a polarizing plate having the fourth protective film 213, the third bonding layer 212, the polarizer (PVA) 211, the fourth bonding layer 214, the third protective film 210, the second adhesive layer 209, the liquid crystal cell 208, the first adhesive layer 207, the second protective film 205, the second bonding layer 204, and the polarizer (PVA) 203 stacked in this order.

The display device illustrated in FIG. 11 comprises a structure in which a viewing angle compensation film having the coating layer 101, the base 102, and the pattern layer 103 stacked in this order is attached, by the adhesive agent or the bonding agent 104, to a lower side of an advanced true-wide (ATW) polarizing plate having the fourth protective film 213, the third bonding layer 212, the polarizer (PVA) 211, the third protective film 210, the second adhesive layer 209, the liquid crystal cell 208, the first adhesive layer 207, the liquid crystal 206, the second protective film 205, the second bonding layer 204, the polarizer (PVA) 203, the first bonding layer 202, the first protective film 201, and a surface treatment coating layer 215 stacked in this order. The display device comprises a structure in which a viewing angle compensation film having the coating layer 101, the base 102, the pattern layer 103, and the flat layer 105 stacked in this order is attached, by the adhesive agent or the bonding agent 104, to a lower side of an advanced true-wide (ATW) polarizing plate having the fourth protective film 213, the third bonding layer 212, the polarizer (PVA) 211, the third protective film 210, the second adhesive layer 209, the liquid crystal cell 208, the first adhesive layer 207, the liquid crystal 206, the second protective film 205, the second bonding layer 204, the polarizer (PVA) 203, the first bonding layer 202, the first protective film 201, and the surface treatment coating layer 215 stacked in this order.

The display device illustrated in FIG. 12 comprises a structure in which a viewing angle compensation film having the coating layer 101, the base 102, and the pattern layer 103 stacked in this order is attached, by the adhesive agent or the bonding agent 104, to a lower side of a polarizing plate having the fourth protective film 213, the third bonding layer 212, the polarizer (PVA) 211, the third protective film 210, the second adhesive layer 209, the liquid crystal cell 208, the first adhesive layer 207, the second protective film 205, the second bonding layer 204, the polarizer (PVA) 203, the first bonding layer 202, the first protective film 201, and the surface treatment coating layer 215 stacked in this order. The display device comprises a structure in which a viewing angle compensation film having the coating layer 101, the base 102, the pattern layer 103, and the flat layer 105 stacked in this order is attached, by the adhesive agent or the bonding agent 104, to a lower side of a polarizing plate having the fourth protective film 213, the third bonding layer 212, the polarizer (PVA) 211, the third protective film 210, the second adhesive layer 209, the liquid crystal cell 208, the first adhesive layer 207, the second protective film 205, the second bonding layer 204, the polarizer (PVA) 203, the first bonding layer 202, the first protective film 201, and the surface treatment coating layer 215 stacked in this order.

The display device illustrated in FIG. 13 comprises a structure in which a viewing angle compensation film having the coating layer 101, the base 102, and the pattern layer 103 stacked in this order is attached, by the adhesive agent or the bonding agent 104, to a lower side of an advanced true-wide (ATW) polarizing plate having the polarizer (PVA) 211, the third protective film 210, the second adhesive layer 209, the liquid crystal cell 208, the first adhesive layer 207, the liquid crystal 206, the second protective film 205, the second bonding layer 204, the polarizer (PVA) 203, the first bonding layer 202, the first protective film 201, and the surface treatment coating layer 215 stacked in this order. The display device comprises a structure in which a viewing angle compensation film having the coating layer 101, the base 102, the pattern layer 103, and the flat layer 105 stacked in this order is attached, by the adhesive agent or the bonding agent 104, to a lower side of an advanced true-wide (ATW) polarizing plate having the polarizer (PVA) 211, the third protective film 210, the second adhesive layer 209, the liquid crystal cell 208, the first adhesive layer 207, the liquid crystal 206, the second protective film 205, the second bonding layer 204, the polarizer (PVA) 203, the first bonding layer 202, the first protective film 201, and the surface treatment coating layer 215 stacked in this order.

The display device illustrated in FIG. 14 comprises a structure in which a viewing angle compensation film having the coating layer 101, the base 102, and the pattern layer 103 stacked in this order is attached, by the adhesive agent or the bonding agent 104, to a lower side of a polarizing plate having the polarizer (PVA) 211, the third protective film 210, the second adhesive layer 209, the liquid crystal cell 208, the first adhesive layer 207, the second protective film 205, the second bonding layer 204, the polarizer (PVA) 203, the first bonding layer 202, the first protective film 201, and the surface treatment coating layer 215 stacked in this order. The display device comprises a structure in which a viewing angle compensation film having the coating layer 101, the base 102, the pattern layer 103, and the flat layer 105 stacked in this order is attached, by the adhesive agent or the bonding agent 104, to a lower side of a polarizing plate having the polarizer (PVA) 211, the third protective film 210, the second adhesive layer 209, the liquid crystal cell 208, the first adhesive layer 207, the second protective film 205, the second bonding layer 204, the polarizer (PVA) 203, the first bonding layer 202, the first protective film 201, and the surface treatment coating layer 215 stacked in this order.

The polarizing plate comprises the polarizer. The polarizer is not particularly limited, and a polarizer well-known in the art, for example, a film composed of polyvinyl alcohol (PVA) comprising iodine or a dichroic dye is used.

The polarizer exhibits a property capable of extracting only light vibrating in one direction from the light being incident while vibrating in various directions. This property can be achieved by stretching iodine-adsorbed PVA (polyvinyl alcohol) with a strong tensile force. For example, more specifically, a polarizer can be formed through a step of swelling a PVA film by immersing the PVA film in an aqueous solution, a step of dyeing the swollen PVA film with a dichroic material imparting polarizing properties, a step of stretching the dyed PVA film so that the dichroic dye material is arranged in parallel with the stretching direction, and a step of correcting the color of the PVA film which has undergone the stretching step. However, the polarizing plate according to the present invention is not limited thereto.

In addition, the polarizing plate can have a general-purpose polarizer protecting film typically used for one surface or both surfaces of the polarizer. Specific examples of the polarizer protective film can comprise, but not be limited to, polyester, polyacrylic, polyvinyl chloride, polycarbonate, polymethylmethacrylate, polystyrene, polyester sulfone, polybutadiene, triacetate cellulose film (TAC), cycloolefin polymer (COP), or polyethylene terephthalate PET, and the polarizer protective film can be attached to the polarizer by the bonding layer.

Further, the polarizer can comprise, on one surface or both surfaces thereof, a surface treatment coating layer, and the surface treatment coating layer can be provided on the protective film in a case in which the surface treatment coating layer is provided on the polarizer having, on one surface or both surfaces thereof, the protective film. The surface treatment coating layer refers to a functional layer such as anti-light blindness coating, anti-reflection coating (LR, AGLR), low refractive coating, hard coating, anti-glare coating (AG, SG), or wide color gamut coating (LAS).

In a case in which the polarizer protective film is provided on a surface of the polarizer on which the viewing angle compensation film is laminated, the viewing angle compensation film is laminated on the polarizer protective film by the adhesive agent or the bonding agent.

The viewing angle compensation film can be provided at an outermost side of the polarizing plate.

The difference between a refractive index of an optical layer, which is arranged to be close to the pattern layer among one or more optical layers, and a refractive index of the pattern layer can be 0.02 to 0.3, preferably, 0.04 to 0.12. When the difference between the refractive index of the pattern layer and the refractive index of the optical layer has the above-mentioned value, it is possible to improve a viewing angle of the display device comprising the polarizing plate by adjusting the refraction angle of the light which is incident on the pattern layer and emergent from the pattern layer.

The display device comprises: a liquid crystal cell; a first polarizing plate which is provided at a visual field side of the liquid crystal cell; a second polarizing plate which is provided at the opposite side to the visual field side of the liquid crystal cell; and a backlight unit which is provided at a side of the second polarizing plate opposite to a side that faces the liquid crystal cell, in which the first polarizing plate or the second polarizing plate comprises the viewing angle compensation film.

In the present invention, the term "visual field side" means a side or a direction where a polarizing plate is arranged to face a viewer when the polarizing plate is mounted in a display device such as a liquid crystal display device.

On the contrary, the term "opposite side to visual field side" means a side or a direction where the polarizing plate is arranged to face a side opposite to a viewer, that is, face a backlight unit when the polarizing plate is mounted in a display device such as a liquid crystal display device.

According to the exemplary embodiment of the present invention, the viewing angle compensation film can be provided at an outermost periphery of the first or second polarizing plate.

According to the exemplary embodiment of the present invention, the first polarizing plate can comprise the viewing angle compensation film, and the second surface can be arranged to be close to the liquid crystal cell. In addition, the second polarizing plate can comprise the viewing angle compensation film, and the second surface can be arranged to be close to the liquid crystal cell.

A main viewing angle (maximum brightness angle) of the display device varies, and a degree of light concentration is increased, such that a contrast ratio (C/R) can be improved at a position which is not parallel to the display device.

The backlight unit comprises a light source which emits light from a back side of the liquid crystal panel, the type of light source is not particularly limited, and a light source such as a CCFL, an HCFL, or an LED for a general LCD can be used.

MODE FOR INVENTION

Hereinafter, operations and effects of the present invention will be described in more detail with reference to specific examples according to the present invention. However, these examples are given to merely illustrate the present invention and are not intended to limit the scope of the present invention.

EXPERIMENTAL EXAMPLE

Experimental Example 1

Example 1

A viewing angle compensation film was manufactured by forming, on a base, a pattern layer comprising a first surface having a flat surface, and a second surface opposite to the first surface.

In this case, as illustrated in FIG. 4, the pattern layer included the second surface comprising the multiple protruding portions. Each of the protruding portions included a first inclined surface and a second inclined surface. An angle θ formed between the first inclined surface and the second inclined surface was 42 degrees, an angle $\theta_1$ formed between the first inclined surface and the horizontal line and an angle $\theta_2$ formed between the second inclined surface and the horizontal line were 880 and 50°, respectively. That is, the protruding portion had a scalene triangular shape having an acute angle.

A polarizing plate was manufactured by laminating the viewing angle compensation film on a polarizer prepared in advance. Specifically, an adhesive agent was applied onto the second surface of the pattern layer of the viewing angle compensation film, and then the viewing angle compensation film is laminated on one surface of the polarizer by the adhesive agent.

Thereafter, a simulation related to a distribution of contrast ratios (C/R) of the polarizing plate display device was performed by using the Light tools program, and CR values (%) (Area A*CR) were calculated. The simulation was performed under a measurement condition in which the display device was operated with 50 million rays, a used high refractive index was set to 1.56, and a used low refractive index was set to 1.48. The following Table 1 shows the simulation result.

Comparative Example 1

A simulation was performed in the same manner as the simulation in Example 1, except that the viewing angle compensation film of Example 1 according to the present invention was not included. The following Table 1 shows the simulation result.

Comparative Example 2

A simulation was performed in the same manner as the simulation in Example 1, except that the angle θ formed between the first inclined surface and the second inclined surface in Example 1 was set to 90°. The following Table 1 and FIGS. 16 to 18 show the simulation result.

TABLE 1

|  | Comparative Example 1 | Example 1 | Comparative Example 2 |
|---|---|---|---|
| C/R distribution | FIG. 16 | FIG. 17 | FIG. 18 |
| CR % | 100 | 144 | 114 |

Based on the simulation result shown in Table 1, it can be ascertained that the viewing angle CR value (%) of Example 1 in which the viewing angle compensation film according to the present application is attached is increased by about 44% in comparison with Comparative Example 1 in which the viewing angle compensation film according to the present application is not attached. In addition, the viewing angle CR value of Comparative Example 2 comprising the pattern layer in which the angle θ (vertical angle) formed between the first inclined surface and the second inclined surface is out of the range according to the present invention is increased by about 14% in comparison with Comparative Example 1. As a result, it can be ascertained that Example 1 according to the present application has an excellent effect of improving the contrast ratio in comparison with Comparative Example 2.

Experimental Example 2

Example 2

A coating composition for forming a pattern layer was prepared by combining 55 parts by weight of diacrylate (Hannong Chemicals) with 10 moles of thiobisphenol ethylene oxide, 10 parts by weight of diacrylate (Hannong Chemicals) with 10 moles of bisphenol A ethylene oxide, 10 parts by weight of bisphenol A epoxy acrylate oligomer (SK-Cytec), 3 parts by weight of tri(meth)acrylate (Miwon Commercial) with 6 moles of trimethylol propane ethylene oxide, 17 parts by weight of o-phenyl phenoxy ethyl acrylate (NK-ESTER), 3.8 parts by weight of 1-hydroxy cyclo hexylphenyl ketone (CIBA-GEIGY), 1 part by weight of bis 2,4,6-trimethyl benzoyl-phenyl phosphine oxide (CIBA-GEIGY), and 0.2 part by weight of reaction-type silicone (CIBA-GEIGY).

A viewing angle compensation film was prepared by forming a pattern layer on a base (polyethylene terephthalate (PET)) by an imprinting method using a mold in which an angle θ formed between a first inclined surface and a second inclined surface is about 42° and using the coating composition for forming the pattern layer. Thereafter, an adhesive agent (LC-435 of Soken) was applied onto the pattern layer, and then the viewing angle compensation film was laminated at an outermost periphery of a lower polarizing plate of a display device.

Comparative Example 3

A display device was manufactured to be the same as the display device in Example 2, except that the viewing angle compensation film according to the present invention was not included in Example 2.

Comparative Example 4

A display device was manufactured in the same manner as the display device in Example 2, except that a mold in which the angle θ formed between the first inclined surface and the second inclined surface in Example 2 was about 90° was used instead of the mold in which the angle θ was about 42°.

Experimental Example 2

Distributions of contrast ratios (C/R) of the display devices manufactured in Example 2, Comparative Example 3, and Comparative Example 4 were measured. The following Table 2 shows the measurement results.

Contrast Ratio Measuring Device and Condition

The CR values (%) (Area A*CR) were calculated by measuring distributions of viewing angles in an on/off state (white/black mode) of a panel by using EZContrastx188 equipment of Eldim. The following Table 2 and FIGS. 19 to 21 show the calculated CR values.

TABLE 2

|  | Comparative Example 3 | Example 2 | Comparative Example 4 |
|---|---|---|---|
| C/R distribution | FIG. 19 | FIG. 20 | FIG. 21 |
| CR % | 100 | 115 | 84 |

It can be ascertained from Table 2 that the viewing angle CR value of Example 2 in which the viewing angle compensation film according to the present application is used is increased by about 15% in comparison with Comparative Example 3 in which the viewing angle compensation film according to the present application is not used. In addition, the viewing angle CR value of Comparative Example 4 comprising the pattern layer in which the angle θ (vertical angle) formed between the first inclined surface and the second inclined surface is out of the range according to the present invention is decreased by about 16% in comparison with Comparative Example 3. As a result, it can be ascertained that Example 2 according to the present application has an excellent effect of improving the contrast ratio in comparison with Comparative Example 4.

Experimental Example 3

Example 3

A viewing angle compensation film was manufactured by forming a pattern layer on a base by an imprinting method.

In this case, the pattern layer comprises a first surface having a flat surface, and a second surface opposite to the first surface.

In this case, as illustrated in FIG. 4, the pattern layer included the second surface comprising the multiple protruding portions. Each of the protruding portions included a first inclined surface and a second inclined surface. An angle θ formed between the first inclined surface and the second inclined surface was 42 degrees, an angle $θ_1$ formed between the first inclined surface and the horizontal line and an angle $θ_2$ formed between the second inclined surface and the horizontal line were 880 and 50°, respectively. That is, the protruding portion had a scalene triangular shape having an acute angle.

Thereafter, an adhesive agent (LC-435 of Soken) was applied onto the pattern layer, and then the viewing angle compensation film was laminated at an outermost periphery of a lower polarizing plate of a display device.

Comparative Example 5

A display device was manufactured in the same manner as the display device in Example 3 except that the viewing angle compensation film according to the present invention was not included in Example 3.

Comparative Example 6

A viewing angle compensation film was manufactured by the same method as the viewing angle compensation film in Example 3, except that the angle θ formed between the first inclined surface and the second inclined surface was 90 degrees, and the angle $θ_1$ formed between the first inclined surface and the horizontal line and the angle $θ_2$ formed between the second inclined surface and the horizontal line were equally 45 degrees. That is, the protruding portion had an isosceles triangular shape.

Comparative Example 7

A viewing angle compensation film was manufactured by the same method as the viewing angle compensation film in Example 3, except that the angle θ formed between the first inclined surface and the second inclined surface was 80 degrees, and the angle $θ_1$ formed between the first inclined surface and the horizontal line and the angle $θ_2$ formed between the second inclined surface and the horizontal line were equally 50 degrees. That is, the protruding portion had an isosceles triangular shape.

Comparative Example 8

A viewing angle compensation film was manufactured by the same method as the viewing angle compensation film in Example 3, except that the angle θ formed between the first inclined surface and the second inclined surface was 70 degrees, and the angle $θ_1$ formed between the first inclined surface and the horizontal line and the angle $θ_2$ formed between the second inclined surface and the horizontal line were equally 55 degrees. That is, the protruding portion had an isosceles triangular shape.

Comparative Example 9

A viewing angle compensation film was manufactured by the same method as the viewing angle compensation film in Example 3, except that the angle θ formed between the first inclined surface and the second inclined surface was 60 degrees, and the angle $θ_1$ formed between the first inclined surface and the horizontal line and the angle $θ_2$ formed between the second inclined surface and the horizontal line were equally 60 degrees. That is, the protruding portion had an equilateral triangular shape.

Experimental Example 3

Distributions of contrast ratios (C/R) of the display devices manufactured in Example 3 and Comparative Examples 5 to 9 were measured. The following Table 3 shows the measurement results.
Contrast Ratio Measuring Device and Condition The CR values (%) (Area A*CR) were calculated by measuring distributions of viewing angles in an on/off state (white/black mode) of a panel by using Zemax. The following Table 3 and FIGS. 22 to 27 show the result.

Specifically, a simulation related to a distribution of contrast ratios (C/R) of the display device in which the viewing angle compensation film according to the present invention was formed at the outermost periphery of the upper polarizing plate was performed, and the CR values (%) (Area A*CR) were calculated. The simulation was performed under a measurement condition in which the display device is operated with 10 million rays, a used high refractive index was set to 1.61 when a wavelength was 590 nm, and a used low refractive index was set to 1.49. The following Table 3 shows the simulation result. In addition, angular intensity values are disclosed in the drawings for comparison.

In this case, the contrast ratios were measured and indicated in accordance with viewing angles (θ, φ). In a spatial coordinate system comprising a plane (x-y plane) of the viewing angle compensation film and a direction (z-axis) perpendicular to the plane, θ is an angle between the x-y plane and a line segment connecting the detection means and the origin of the spatial coordinate system, and φ is an angle formed between the y axis and a line segment connecting the origin of the spatial coordinate system and the point when the detection means is orthogonally projected on the x-y plane. FIG. 15 illustrates the viewing angle.

The x-axis is a direction parallel or perpendicular to a long axis of the surface of the display device.

TABLE 3

| Viewing Angle | | Comparative | Example | Comparative | Comparative | Comparative | Comparative |
|---|---|---|---|---|---|---|---|
| θ | φ | Example 5 | 3 | Example 6 | Example 7 | Example 8 | Example 9 |
| 42 | 23 | 100% | 116% | 85% | 89% | 97% | 110% |
| 42 | 157 | 100% | 117% | 87% | 92% | 100% | 112% |
| 41 | 192 | 100% | 70% | 85% | 91% | 98% | 111% |

TABLE 3-continued

| Viewing Angle θ | φ | Comparative Example 5 | Example 3 | Comparative Example 6 | Comparative Example 7 | Comparative Example 8 | Comparative Example 9 |
|---|---|---|---|---|---|---|---|
| 41 | 348 | 100% | 72% | 84% | 89% | 96% | 110% |
| 0 | 0 | 100% | 95% | 102% | 101% | 96% | 96% |
| C/R distribution | | FIG. 22 | FIG. 23 | FIG. 24 | FIG. 25 | FIG. 26 | FIG. 27 |

The percentage values in Table 3 are based on 100% of the simulation results when no viewing angle compensation film is included. It can be ascertained from Table 3 that the contrast ratio is improved at various viewing angles when the protruding portion has the cross section having the asymmetric structure (Example 3). However, it can be ascertained that the effect of improving the contrast ratio is decreased when the protruding portion has the cross section having the symmetrical structure.

DESCRIPTION OF REFERENCE NUMERALS

10: Base film
11: Pattern layer
101: Coating layer
102: Base
103: Pattern layer
104: Adhesive agent or bonding agent
105: Flat layer
201: First protective film
202: First bonding layer
203: Polarizer (PVA)
204: Second bonding layer
205: Second protective film
206: Liquid crystal
207: First adhesive layer
208: Liquid crystal cell
209: Second adhesive layer
210: Third protective film
211: Polarizer (PVA)
212: Third bonding layer
213: Fourth protective film
214: Fourth bonding layer
215: Surface treatment coating layer
301: Viewing angle compensation film
302: Polarizing plate

The invention claimed is:

1. A method of manufacturing a viewing angle compensation film, the method comprising:
preparing a base; and
forming a pattern layer on the base, wherein:
the pattern layer comprises a first surface comprising a flat surface, and a second surface opposite to the first surface;
the second surface comprises multiple protruding portions;
each of the protruding portions comprises a first inclined surface and a second inclined surface;
an angle θ formed between the first inclined surface and the second inclined surface is 20° to 60°;
the method further comprises forming a flat layer on the second surface of the pattern layer;
the forming the pattern layer on the base comprises: applying an ultraviolet curable resin onto a mold, transferring the UV-curable resin onto the base by performing a primary curing process of emitting UV rays, and forming the pattern layer on the base by performing a secondary curing process of emitting UV rays; and
the primary curing process is performed by emitting UV rays at the moment the mold and the base come into contact with each other.

2. The method of claim 1, wherein each of the protruding portions has a cross section having an asymmetric structure.

3. The method of claim 1, wherein a difference between an angle $θ_1$ formed between the first inclined surface of the protruding portion and a horizontal line and an angle $θ_2$ formed between the second inclined surface and the horizontal line is within a range from 30 degrees to 70 degrees.

4. The method of claim 1, wherein the forming of the pattern layer is performed by an imprinting method.

5. The method of claim 1, wherein the forming of the flat layer is performed by an imprinting method.

6. The method of claim 1, wherein the flat layer comprises ultraviolet curable resin.

7. The method of claim 1, wherein at least one cross section perpendicular to the first surface has a triangular or quadrangular shape.

8. A method of manufacturing a polarizing plate, the method comprising:
preparing a polarizer; and
laminating, on at least one surface of the polarizer, a viewing angle compensation film manufactured by the manufacturing method according to claim 1,
wherein the laminating of the viewing angle compensation film comprises:
applying an adhesive agent or a bonding agent onto a second surface of a pattern layer of the viewing angle compensation film;
drying the viewing angle compensation film; and
attaching a surface of the viewing angle compensation film, onto which the adhesive agent or the bonding agent is applied, to one surface of the polarizer.

* * * * *